United States Patent
Park et al.

(10) Patent No.: US 12,489,580 B2
(45) Date of Patent: Dec. 2, 2025

(54) METHOD AND APPARATUS FOR TRANSMITTING AND RECEIVING UPLINK SIGNAL IN A WIRELESS COMMUNICATION

(71) Applicant: LG ELECTRONICS INC., Seoul (KR)

(72) Inventors: Haewook Park, Seoul (KR); Jiwon Kang, Seoul (KR); Kyuseok Kim, Seoul (KR); Seongwon Go, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 405 days.

(21) Appl. No.: 18/077,627

(22) Filed: Dec. 8, 2022

(65) Prior Publication Data

US 2023/0336306 A1   Oct. 19, 2023

(30) Foreign Application Priority Data

Apr. 13, 2022   (KR) .......................... 10-2022-0045857

(51) Int. Cl.
*H04L 5/00* (2006.01)
*H04W 72/23* (2023.01)

(52) U.S. Cl.
CPC ............ *H04L 5/0051* (2013.01); *H04L 5/006* (2013.01); *H04L 5/0094* (2013.01); *H04W 72/23* (2023.01)

(58) Field of Classification Search
CPC ..... H04L 5/0051; H04L 5/006; H04L 5/0094; H04L 5/0064; H04L 5/0023;
(Continued)

(56) References Cited

U.S. PATENT DOCUMENTS

2020/0412582 A1*  12/2020  Manolakos ........... H04L 5/0016
2022/0210667 A1*   6/2022  Fan ....................... H04B 7/0639
(Continued)

FOREIGN PATENT DOCUMENTS

CN        108880646 A  * 11/2018
WO        2021020847     2/2021
(Continued)

OTHER PUBLICATIONS

List of RAN1 agreements in RAN1#92bis 93_v1, 3GPP Draft; 3rd Generation Partnership Project (3GPP), Mobile Competence Centre, vol. RAN WG1, No. 20180401, Jun. 7, 2018.

*Primary Examiner* — Rownak Islam
(74) *Attorney, Agent, or Firm* — BRYAN CAVE LEIGHTON PAISNER LLP

(57) ABSTRACT

A method and an apparatus for transmitting and receiving a sounding reference signal (SRS) in a wireless communication system are disclosed. A method for transmitting the SRS by a terminal in a wireless communication system according to an embodiment of the present disclosure may comprise: receiving, from a base station, configuration information related to an SRS resource set for the SRS, wherein the SRS resource set includes at least one SRS resource; and transmitting, to the base station, the SRS based on the at least one SRS resource. The configuration information may include information on at least one reference resource, and based on the SRS resource set being configured with a specific usage and one reference resource being configured by the configuration information, the SRS may be transmitted based on a first spatial parameter different from a second spatial parameter corresponding to the one reference resource.

12 Claims, 21 Drawing Sheets

(58) Field of Classification Search
CPC ... H04L 5/0048; H04L 5/0057; H04L 5/0073; H04W 72/23; H04B 7/06952; H04B 7/0456; H04B 7/0617
USPC .......................................................... 370/329
See application file for complete search history.

(56) References Cited

U.S. PATENT DOCUMENTS

2022/0272674 A1    8/2022  Go et al.
2023/0216635 A1    7/2023  Park et al.
2023/0403118 A1*  12/2023  Xiao .................... H04B 7/0602

FOREIGN PATENT DOCUMENTS

WO    2021246834    12/2021
WO    2021252865    12/2021

* cited by examiner

METHOD AND APPARATUS FOR TRANSMITTING AND RECEIVING UPLINK SIGNAL IN A WIRELESS COMMUNICATION

CROSS-REFERENCE TO RELATED APPLICATIONS

This application claims the benefit of earlier filing date and right of priority to Korean Application No. 10-2022-0045857, filed on Apr. 13, 2022, the contents of which are all hereby incorporated by reference herein in their entirety.

TECHNICAL FIELD

The present disclosure relates to a wireless communication system, and more particularly, to a method and apparatus for transmitting and receiving a sounding reference signal in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

A technical object of the present disclosure is to provide a method and apparatus for transmitting and receiving a sounding reference signal (SRS) in a wireless communication system.

In addition, an additional technical object of the present disclosure is to provide a method and apparatus for efficiently mitigating signal and/or channel interference based on SRS transmission and reception.

The technical objects to be achieved by the present disclosure are not limited to the above-described technical objects, and other technical objects which are not described herein will be clearly understood by those skilled in the pertinent art from the following description.

A method for transmitting a sounding reference signal (SRS) by a terminal in a wireless communication system according to an aspect of the present disclosure may comprise: receiving, from a base station, configuration information related to an SRS resource set for the SRS, wherein the SRS resource set includes at least one SRS resource; and transmitting, to the base station, the SRS based on the at least one SRS resource. The configuration information may include information on at least one reference resource, and based on the SRS resource set being configured with a specific usage and one reference resource being configured by the configuration information, the SRS may be transmitted based on a first spatial parameter different from a second spatial parameter corresponding to the one reference resource.

A method for receiving a sounding reference signal (SRS) by a base station in a wireless communication system according to an additional aspect of the present disclosure may comprise: transmitting, to a terminal, configuration information related to an SRS resource set for the SRS, wherein the SRS resource set includes at least one SRS resource; and receiving, from the terminal, the SRS based on the at least one SRS resource. The configuration information may include information on at least one reference resource, and based on the SRS resource set being configured with a specific usage and one reference resource being configured by the configuration information, the SRS may be transmitted based on a first spatial parameter different from a second spatial parameter corresponding to the one reference resource.

According to an embodiment of the present disclosure, a method and apparatus for transmitting and receiving a sounding reference signal (SRS) in a wireless communication system may be provided.

In addition, according to an embodiment of the present disclosure is to provide a method and apparatus for efficiently mitigating signal and/or channel interference based on SRS transmission and reception.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

DETAILED DESCRIPTION

Figure 1:
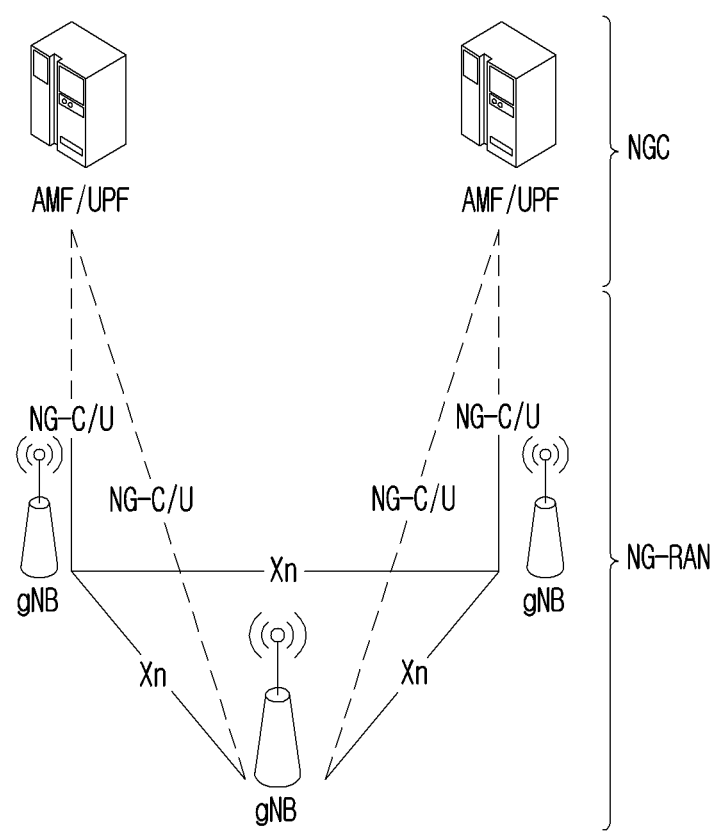
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR (New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN (New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information-reference signal resource indicator
CSI: channel state information
CSI-IM: channel state information interference measurement
CSI-RS: channel state information-reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC (New Generation Core) through an NG interface. In more detail, the gNB is connected to an AMF (Access and Mobility Management Function) through an N2 interface, and is connected to a UPF (User Plane Function) through an N3 interface.

Figure 2:
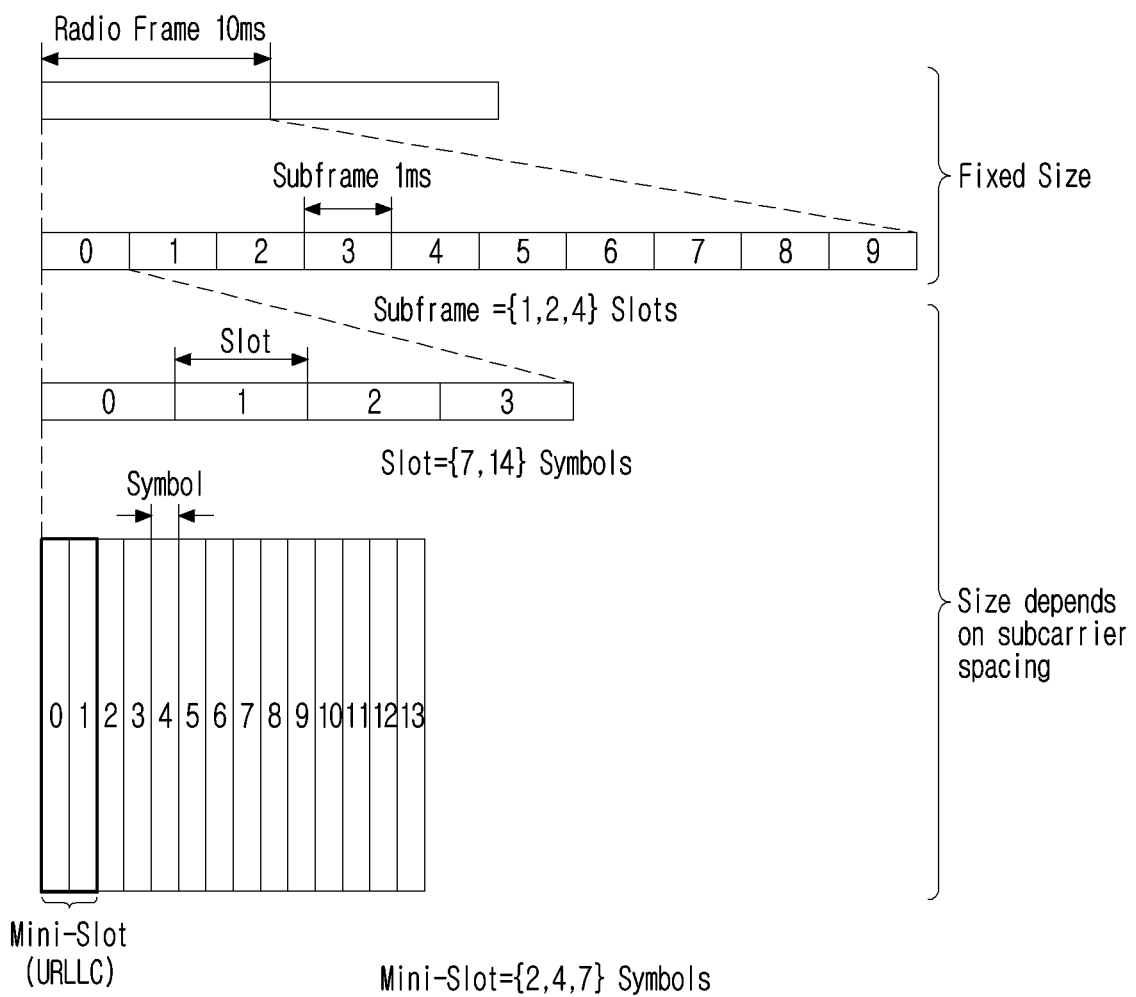
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, μ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | $\Delta f = 2^\mu \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is $480 \cdot 10^3$ Hz and $N_f$ is 4096. Downlink and uplink transmission is configured (organized) with a radio frame having a duration of $T_f=1/(\Delta f_{max} N_f/100) \cdot T_c=10$ ms. Here, a radio frame is configured with 10 subframes having a duration of $T_{sf}=(\Delta f_{max} N_f/1000) \cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration p, slots are numbered in an increasing order of $n_s^\mu \in \{0, \ldots, N_{slot}^{subframe,\mu}-1\}$ in a subframe and are numbered in an increasing order of $n_{s,f}^\mu \in \{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^\mu$ in a subframe is temporally arranged with a start of an OFDM symbol $n_s^\mu N_{symb}^{slot}$ in the same subframe. All terminals may not perform transmission and reception at the same time, which means that all OFDM symbols of a downlink slot or an uplink slot may not be used. Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
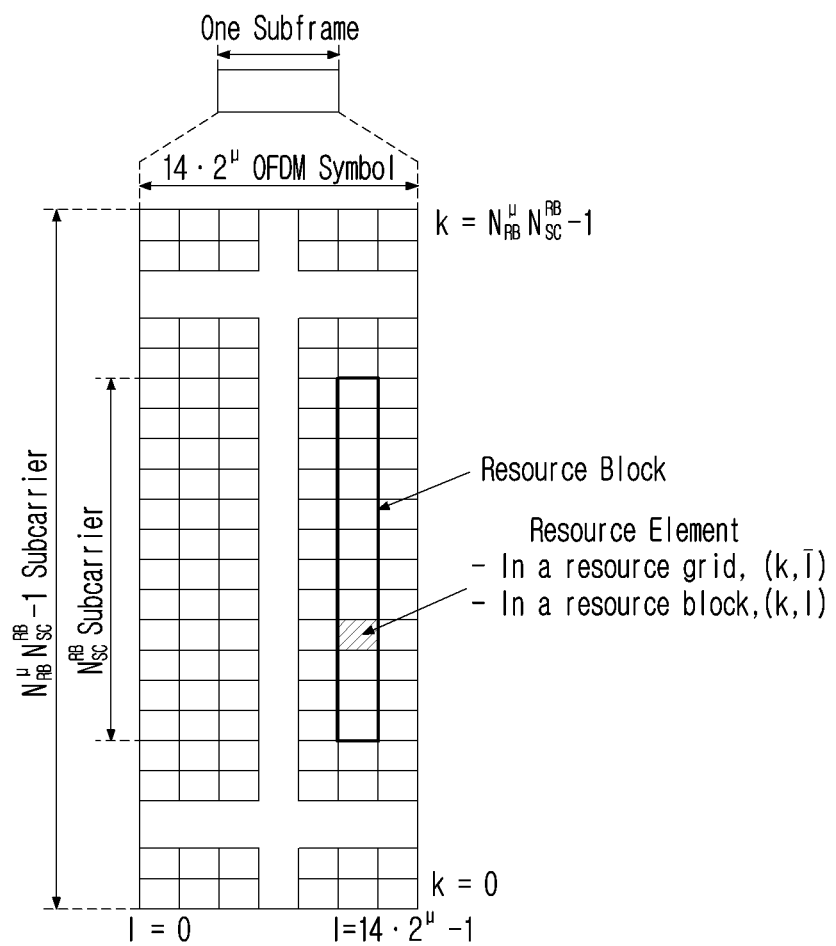
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^\mu N_{sc}^{RB}$ subcarriers in a frequency domain and one subframe is configured with $14 \cdot 2^\mu$ OFDM symbols, but it is not limited thereto. In an NR system, a transmitted signal is described by OFDM symbols of $2^\mu N_{symb}^{(\mu)}$ and one or more resource grids configured with $N_{RB}^\mu N_{sc}^{RB}$ subcarriers. Here, $N_{RB}^\mu \leq N_{RB}^{max,\mu}$. The $N_{RB}^{max,\mu}$ represents a maximum transmission bandwidth, which may be different between an uplink and a downlink as well as between numerologies. In this case, one resource grid may be configured per μ and antenna port p. Each element of a resource grid for μ and an antenna port p is referred to as a resource element and is uniquely identified by an index pair (k,l'). Here, k=0, . . . , $N_{RB}^\mu N_{sc}^{RB}-1$ is an index in a frequency domain and l'=0, . . . , $2^\mu N_{symb}^{(\mu)}-1$ refers to a position of a symbol in a subframe. When referring to a resource element in a slot, an index pair (k,l) is used. Here, l=0, . . . , $N_{symb}^\mu-1$. A resource element (k,l') for μ and an antenna port p corresponds to a complex value, $a_{k,l'}^{(p,\mu)}$. When there is no risk of confusion or when a specific antenna port or numerology is not specified, indexes p and p may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number $n_{CRB}^\mu$ and a resource element (k,l) for a subcarrier spacing configuration μ in a frequency domain is given as in the following Equation 1.

$$n_{CRB}^\mu = \left\lfloor \frac{k}{N_{sc}^{RB}} \right\rfloor \quad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^\mu = n_{PRB}^\mu + N_{BWP,i}^{start,\mu} \quad \text{[Equation 2]}$$

$N_{BWP,i}^{start,\mu}$ is a common resource block that a BWP starts relatively to common resource block 0.

Figure 4:
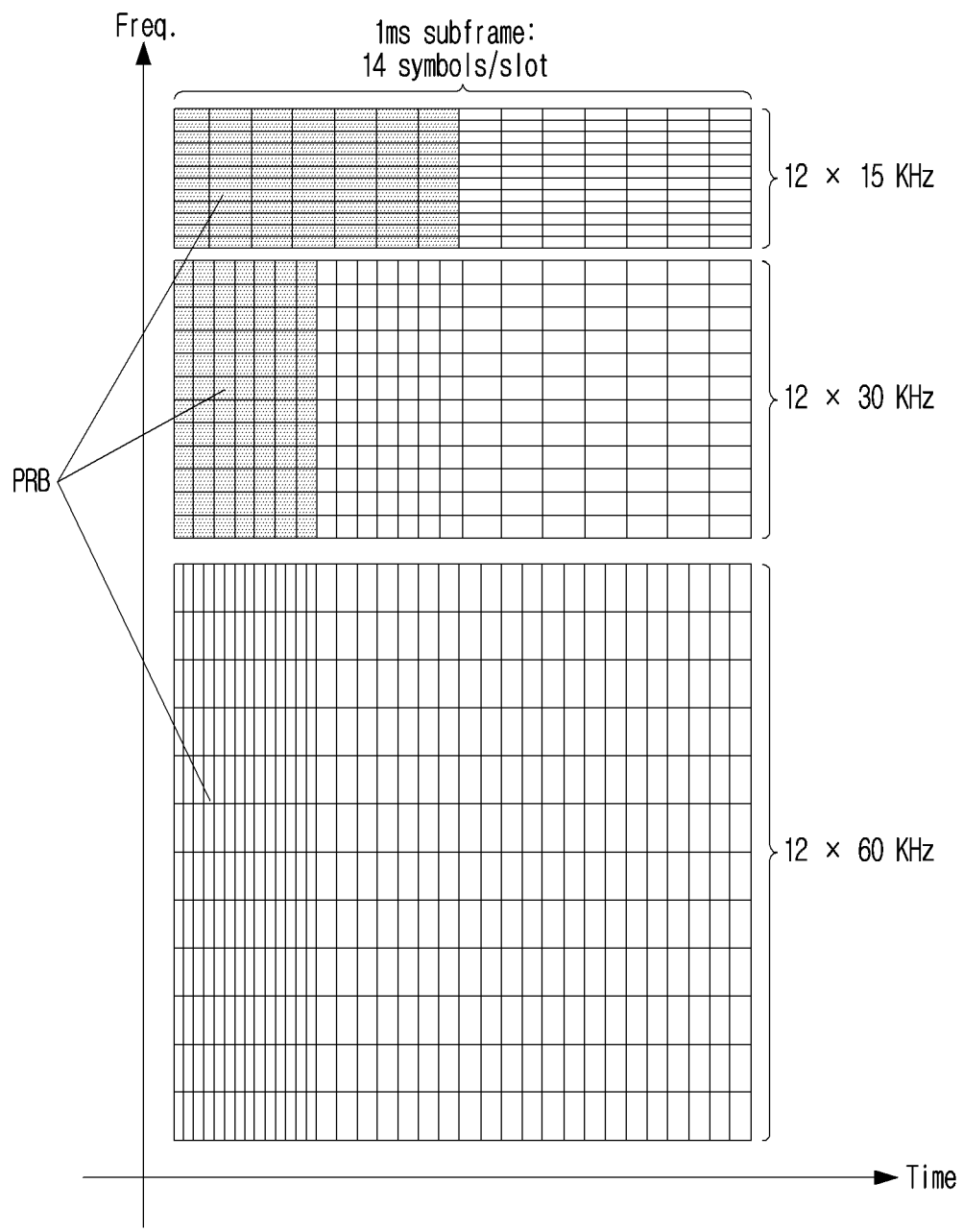
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
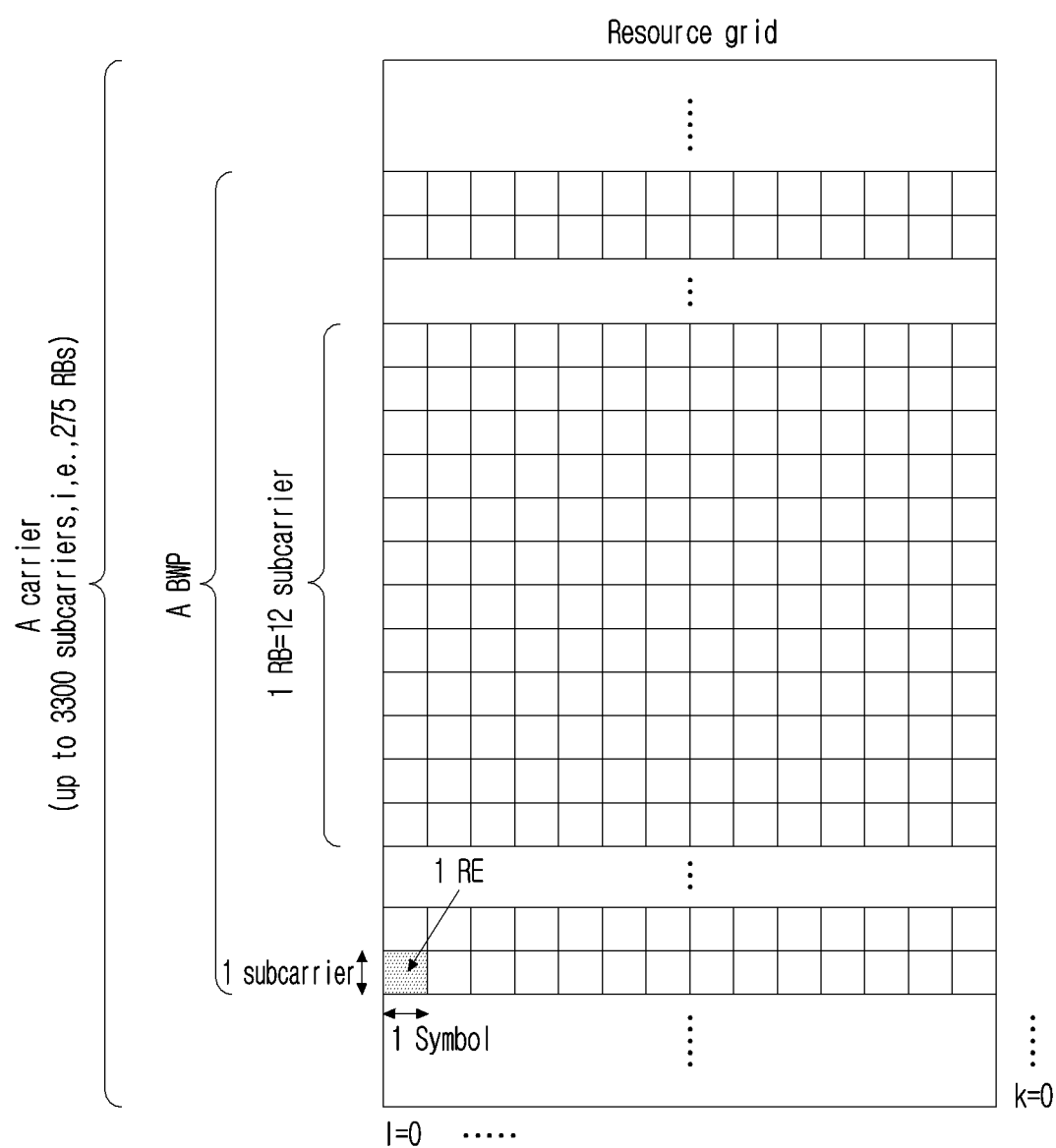
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
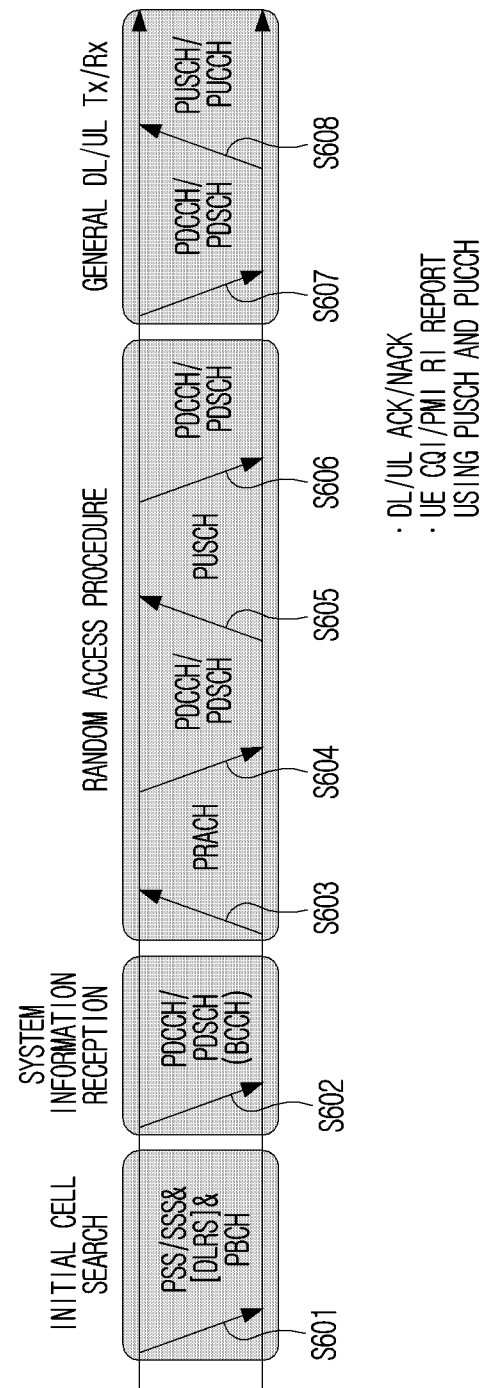
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH)

from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
| --- | --- |
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined. DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Beam Management (BM)

A BM procedure is L1 (layer 1)/L2 (layer 2) procedures to obtain and maintain a set of beams of a base station (e.g., a gNB, a TRP, etc.) and/or terminal (e.g., a UE) beams which may be used for downlink (DL) and uplink (UL) transmission/reception, it may include the following procedures and terms.

Beam measurement: An operation that a base station or a UE measures a property of a received beamformed signal Beam determination: An operation that a base station or a UE selects its Tx beam/Rx beam Beam sweeping: An operation that a spatial region is covered by using a Tx and/or Rx beam for a certain time interval in a pre-determined method Beam report: An operation that a UE reports information of a beamformed signal based on beam measurement A BM procedure may be classified into (1) a DL BM procedure using a SS (synchronization signal)/PBCH (physical broadcast channel) Block or a CSI-RS and (2) an UL BM procedure using an SRS (sounding reference signal).

In addition, each BM procedure may include Tx beam sweeping for determining a Tx Beam and Rx beam sweeping for determining a Rx beam.

Hereinafter, a DL BM procedure will be described.

A DL BM procedure may include (1) transmission of beamformed DL RSs (reference signals) of a base station (e.g., a CSI-RS or a SS Block (SSB)) and (2) beam reporting of a terminal.

Here, beam reporting may include preferred DL RS ID (identifier)(s) and corresponding L1-RSRP (Reference Signal Received Power).

The DL RS ID may be a SSBRI (SSB Resource Indicator) or a CRI (CSI-RS Resource Indicator).

Hereinafter, a DL BM procedure using an SSB will be described.

Figure 7:
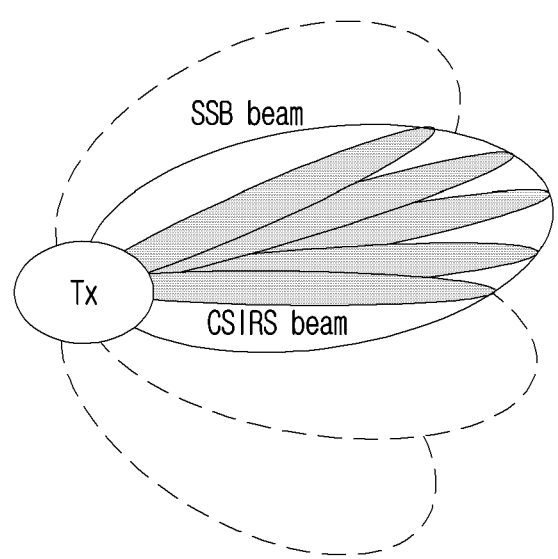
FIG. 7 is a diagram which illustrates a downlink beam management operation in a wireless communication system to which the present disclosure may be applied.

FIG. 7 is a diagram which illustrates a downlink beam management operation in a wireless communication system to which the present disclosure may be applied.

In reference to FIG. 7, an SSB beam and a CSI-RS beam may be used for beam measurement. A measurement metric is L1-RSRP per resource/block. An SSB may be used for coarse beam measurement and a CSI-RS may be used for fine beam measurement. An SSB may be used for both of Tx beam sweeping and Rx beam sweeping.

Rx beam sweeping using an SSB may be performed while an UE changes an Rx beam for the same SSBRI across a plurality of SSB bursts. In this case, one SS burst includes one or more SSBs and one SS burst set includes one or more SSB bursts.

Figure 8:
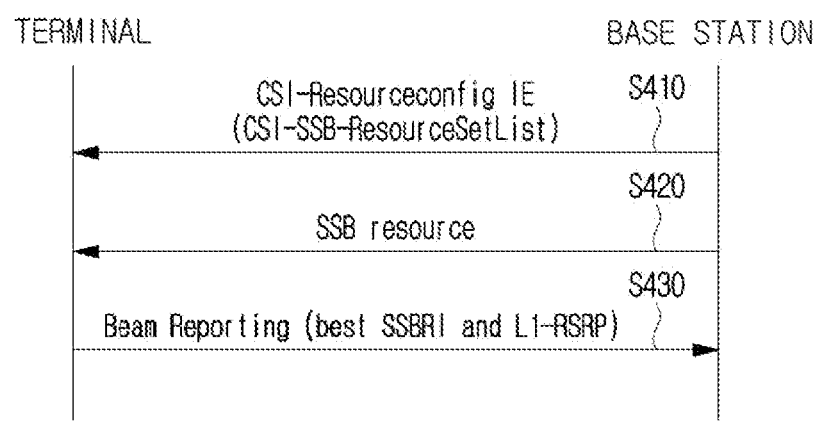
FIG. 8 is a diagram which illustrates a downlink beam management procedure using SSB in a wireless communication system to which the present disclosure may be applied.

FIG. 8 is a diagram which illustrates a downlink beam management procedure using SSB in a wireless communication system to which the present disclosure may be applied.

A configuration on a beam report using an SSB is performed in a CSI/beam configuration in a RRC connected state (or a RRC connected mode).

In reference to FIG. 8, a terminal receives CSI-ResourceConfig IE including CSI-SSB-ResourceSetList including SSB resources used for BM from a base station (S410).

Table 6 represents an example of CSI-ResourceConfig IE and as in Table 6, a BM configuration using an SSB configures an SSB like a CSI-RS resource without being separately defined.

SSB index may be defined from 0 to 63. A terminal receives an SSB resource from the base station based on the CSI-SSB-ResourceSetList (S420).

When CSI-RS reportConfig related to a report on a SSBRI and L1-RSRP is configured, the terminal performs (beam) reporting of the best SSBRI and corresponding L1-RSRP to a base station (S430).

Hereinafter, a DL BM procedure using a CSI-RS will be described.

Describing a usage of a CSI-RS, i) a repetition parameter is configured for a specific CSI-RS resource set and when TRS_info is not configured, a CSI-RS is used for beam management. ii) when a repetition parameter is not configured and TRS_info is configured, a CSI-RS is used for a TRS (tracking reference signal). iii) when a repetition parameter is not configured and TRS_info is not configured, a CSI-RS is used for CSI acquisition.

Such a repetition parameter may be configured only for CSI-RS resource sets associated with CSI-ReportConfig having a report of L1 RSRP or 'No Report (or None)'.

If a terminal is configured with CSI-ReportConfig in which reportQuantity is configured as 'cri-RSRP' or 'none' and CSI-ResourceConfig for channel measurement (a higher layer parameter resourcesForChannelMeasurement) does not include a higher layer parameter 'trs-Info' and includes NZP-CSI-RS-ResourceSet in which a higher layer parameter 'repetition' is configured, the terminal may be configured only with a same number of port (1-port or 2-port) having a higher layer parameter 'nrofPorts' for all CSI-RS resources in NZP-CSI-RS-ResourceSet.

When (a higher layer parameter) repetition is configured as 'ON', it is related to a Rx beam sweeping procedure of a terminal. In this case, when a terminal is configured with NZP-CSI-RS-ResourceSet, the terminal may assume that at least one CSI-RS resource in NZP-CSI-RS-ResourceSet is transmitted with the same downlink spatial domain transmission filter. In other words, at least one CSI-RS resource in NZP-CSI-RS-ResourceSet is transmitted through the same Tx beam. Here, at least one CSI-RS resource in NZP-CSI-RS-ResourceSet may be transmitted in a different OFDM symbol. In addition, a terminal does not expect to

TABLE 6

```
ASN1START
TAG-CSI-RESOURCECONFIG-START
CSI-ResourceConfig ::=                        SEQUENCE {
csi-ResourceConfigId                          CSI-ResourceConfigId,
csi-RS-ResourceSetList                        CHOICE {
nzp-CSI-RS-SSB                                SEQUENCE {
nzp-CSI-RS-ResourceSetList                    SEQUENCE (SIZE (1..maxNrofNZP-CSI-RS-
ResourceSetsPerConfig)) OF NZP-CSI-RS-ResourceSetId OPTIONAL,
csi-SSB-ResourceSetList                       SEQUENCE (SIZE (1..maxNrofCSI-SSB-
ResourceSetsPerConfig)) OF CSI-SSB-ResourceSetId     OPTIONAL
},
csi-IM-ResourceSetList                        SEQUENCE (SIZE (1..maxNrofCSI-IM-
ResourceSetsPerConfig)) OF CSI-IM-ResourceSetId
},
bwp-Id                                        BWP-Id,
resourceType                                  ENUMERATED { aperiodic, semiPersistent,
periodic },
...
}
TAG-CSI-RESOURCECONFIGTOADDMOD-STOP
-- ASN1STOP
```

In Table 6, a csi-SSB-ResourceSetList parameter represents a list of SSB resources used for beam management and reporting in one resource set. Here, an SSB resource set may be configured as {SSBx1, SSBx2, SSBx3, SSBx4, . . . }. An SSB index may be defined from 0 to 63.

receive a different periodicity in periodicityAndOffset in all CSI-RS resources in NZP-CSI-RS-Resourceset.

Meanwhile, when repetition is configured as 'OFF', it is related to a Tx beam sweeping procedure of a base station.

In this case, when repetition is configured as 'OFF', a terminal does not assume that at least one CSI-RS resource in NZP-CSI-RS-ResourceSet is transmitted in the same downlink spatial domain transmission filter. In other words, at least one CSI-RS resource in NZP-CSI-RS-ResourceSet is transmitted through a different Tx beam.

In other words, when reportQuantity of the CSI-RS reportConfig IE is configured as 'ssb-Index-RSRP', a terminal reports the best SSBRI and corresponding L1-RSRP to a base station.

In addition, when a CSI-RS resource may be configured in the same OFDM symbol(s) as an SSB(SS/PBCH Block) and 'QCL-TypeD' is applicable, the terminal may assume that a CSI-RS and an SSB are quasi co-located with regard to 'QCL-TypeD'.

Here, the QCL TypeD may mean that antenna ports are quasi-colocated with regard to a spatial Rx parameter. When a terminal receives a plurality of DL antenna ports in a QCL Type D relationship, it is allowed to apply the same Rx beam. In addition, a terminal does not expect that a CSI-RS will be configured in a RE overlapped with a RE of an SSB.

Figure 9:
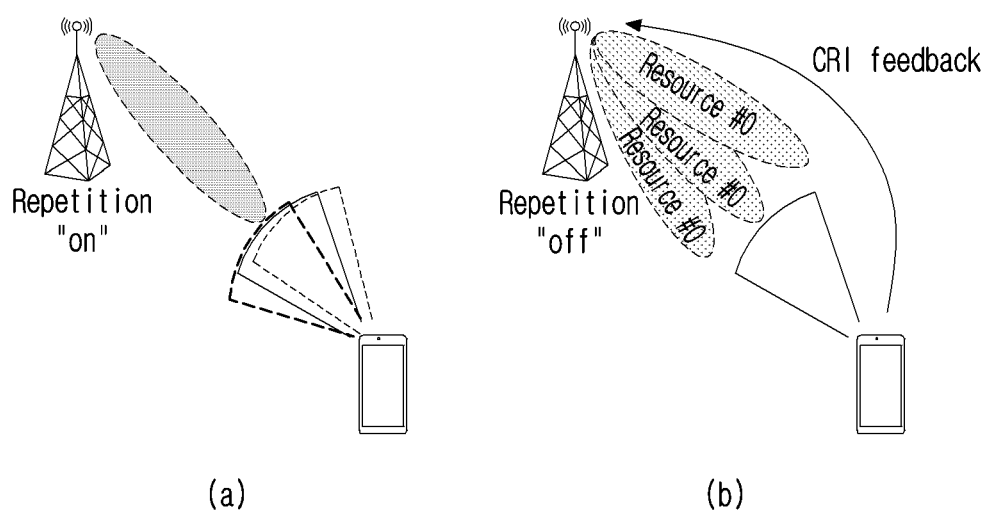
FIG. 9 is a diagram which illustrates a downlink beam management operation using CSI-RS in a wireless communication system to which the present disclosure may be applied.

FIG. 9 is a diagram which illustrates a downlink beam management operation using CSI-RS in a wireless communication system to which the present disclosure may be applied.

FIG. 9(a) represents a Rx beam determination (or refinement) procedure of a terminal and FIG. 9(b) represents a Tx beam sweeping procedure of a base station. In addition, FIG. 9(a) is a case when a repetition parameter is configured as 'ON' and FIG. 9(b) is a case when a repetition parameter is configured as 'OFF'.

Figure 10:
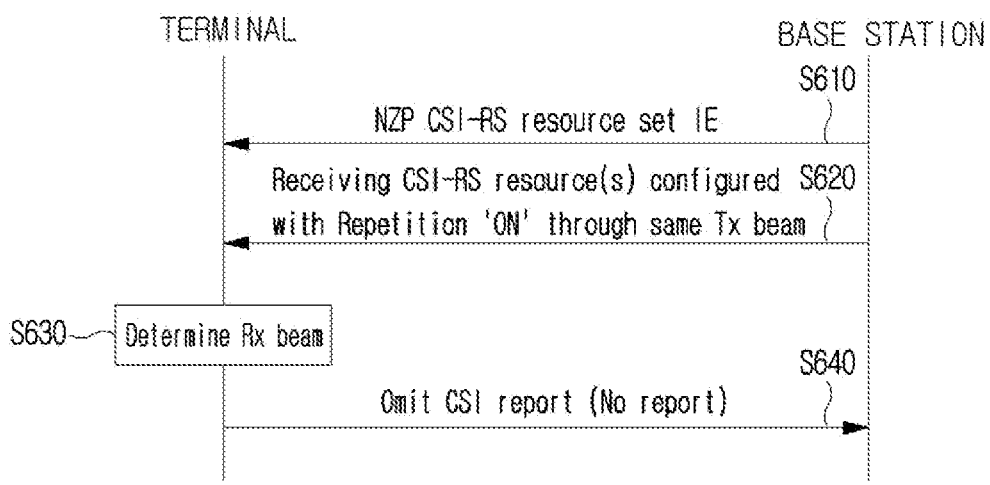
FIG. 10 is a diagram which illustrates an Rx beam determination process of a terminal in a wireless communication system to which the present disclosure may be applied.

FIG. 10 is a diagram which illustrates an Rx beam determination process of a terminal in a wireless communication system to which the present disclosure may be applied.

In reference to FIG. 9(a) and FIG. 10, an Rx beam determination process of a terminal is described.

A terminal receives NZP CSI-RS resource set IE including a higher layer parameter repetition through RRC signaling from a base station (S610). Here, the repetition parameter is configured as 'ON'.

A terminal repetitively receives resources in a CSI-RS resource set configured as repetition 'ON' through the same Tx beam (or DL spatial domain transmission filter) of a base station in a different OFDM symbol (S620).

A terminal determines its Rx beam (S630).

A terminal omits a CSI report (S640). In this case, reportQuantity of a CSI report configuration may be configured as 'No report (or None)'.

In other words, the terminal may omit a CSI report when it is configured as repetition 'ON'.

Figure 11:
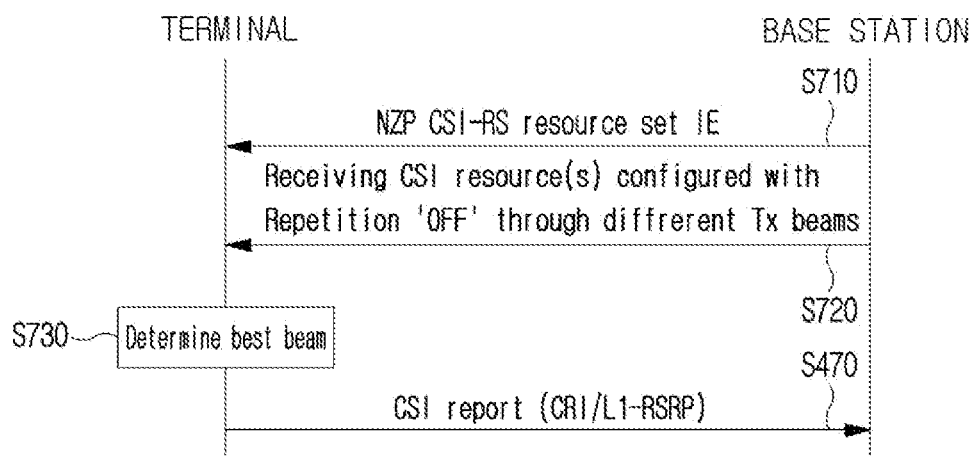
FIG. 11 is a diagram which illustrates a Tx beam determination process of a base station in a wireless communication system to which the present disclosure may be applied.

FIG. 11 is a diagram which illustrates a Tx beam determination process of a base station in a wireless communication system to which the present disclosure may be applied.

In reference to FIG. 9(b) and FIG. 11, a Tx beam determination process of a base station is described.

A terminal receives NZP CSI-RS resource set IE including a higher layer parameter repetition through RRC signaling from a base station (S710). Here, the repetition parameter is configured as 'OFF' and it is related to a Tx beam sweeping procedure of a base station.

A terminal receives resources in a CSI-RS resource set configured as repetition 'OFF' through a different Tx beam (or DL spatial domain transmission filter) of a base station (S720).

A terminal selects (or determines) the best beam (S740).

A terminal reports an ID and related quality information (e.g., L1-RSRP) of a selected beam to a base station (S740).

In this case, reportQuantity of a CSI report configuration may be configured as 'CRI+L1-RSRP'.

In other words, when a CSI-RS is transmitted for BM, the terminal reports a CRI and a related L1-RSRP.

Figure 12:
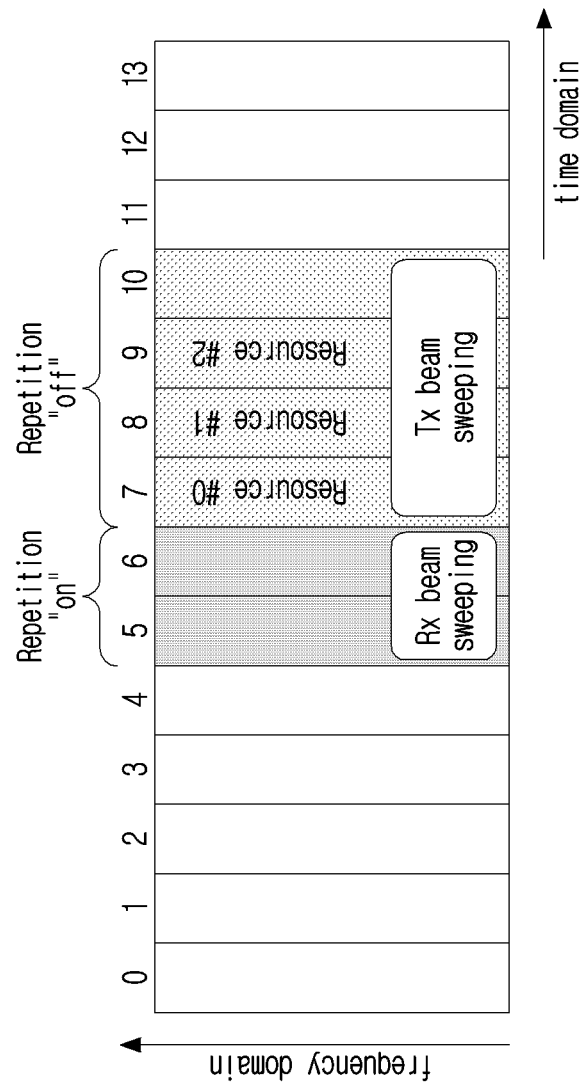
FIG. 12 is a diagram which illustrates resource allocation in a time and frequency domain related to a downlink beam management operation in a wireless communication system to which the present disclosure may be applied.

FIG. 12 is a diagram which illustrates resource allocation in a time and frequency domain related to a downlink beam management operation in a wireless communication system to which the present disclosure may be applied.

In reference to FIG. 12, it is shown that when repetition 'ON' is configured in a CSI-RS resource set, a plurality of CSI-RS resources are repetitively used by applying the same Tx beam and when repetition 'OFF' is configured in a CSI-RS resource set, different CSI-RS resources are transmitted in a different Tx beam.

Hereinafter, a beam indication method related to downlink BM will be described.

A terminal may be configured by RRC with a list of a maximum M candidate transmission configuration indication (TCI) states at least for a purpose of a QCL (Quasi Co-location) indication. Here, M may be 64.

Each TCI state may be configured as one RS set. Each ID of a DL RS at least for a spatial QCL purpose (QCL Type D) in a RS set may refer to one of DL RS types such as an SSB, a P (periodic)-CSI RS, an SP (semi-persistent)-CSI RS, an A (aperiodic)-CSI RS, etc.

An ID of DL RS(s) in a RS set used at least for a purpose of a spatial QCL may be initialized/updated at least by explicit signaling.

Table 7 illustrates a TCI-State information element (IE).

A TCI-State IE is associated with a quasi co-location (QCL) type corresponding to one or two DL reference signals (RS).

TABLE 7

ASN1START
TAG-TCI-STATE-START
TCI-State ::=         SEQUENCE {
 tci-StateId          TCI-StateId,
 qcl-Type1            QCL-Info,
 qcl-Type2            QCL-Info
                      OPTIONAL, -- Need R
 ...
}
QCL-Info ::=          SEQUENCE {
 cell                 ServCellIndex
                      OPTIONAL, -- Need R
 bwp-Id               BWP-Id
                      OPTIONAL, -- Cond CSI-RS-Indicated
 referenceSignal      CHOICE {
  csi-rs              NZP-CSI-RS-ResourceId,
  ssb                 SSB-Index
 },
 qcl-Type             ENUMERATED {typeA, typeB, typeC, typeD},
 ...
}
TAG-TCI-STATE-STOP
-- ASN1STOP In Table 7, a bwp-Id parameter represents a DL BWP (bandwidth part) where an RS is located, a cell parameter represents a carrier where a RS is located and a referencesignal parameter represents reference antenna port(s) which is a source of a quasi co-location for corresponding target antenna port(s) or a reference signal including it. The target antenna port(s) may be a CSI-RS, a PDCCH DMRS, or a PDSCH DMRS. In an example, a corresponding TCI state ID (identifier) may be indicated in NZP CSI-RS resource configuration information to indicate QCL reference RS information for a NZP (non-zero power) CSI-RS. In another example, a TCI state ID may be indicated to each CORESET configuration to indicate QCL reference information for PDCCH DMRS antenna port(s). In another example, a TCI state ID may be indicated through DCI to indicate QCL reference information for PDSCH DMRS antenna port(s).

Hereinafter, uplink beam management will be described.

For UL BM, beam reciprocity (or beam correspondence) between a Tx beam and a Rx beam may be valid or may not be valid according to terminal implementation. If reciprocity between a Tx beam and a Rx beam is valid both in a base station and a terminal, a UL beam pair may be matched by a DL beam pair. But, when reciprocity between a Tx beam and a Rx beam is not valid in any one of a base station and a terminal, a process for determining a UL beam pair is required separately from a DL beam pair determination.

In addition, although both of a base station and a terminal maintain beam correspondence, a base station may use a UL BM procedure for determining a DL Tx beam without requesting a terminal to report a preferred beam.

UL BM may be performed through beamformed UL SRS transmission and whether UL BM of an SRS resource set is applied may be configured by a (higher layer parameter) usage. When a usage is configured as 'BeamManagement (BM)', only one SRS resource may be transmitted in each of a plurality of SRS resource sets in a given time instant.

A terminal may be configured with one or more SRS (Sounding Reference Symbol) resource sets configured by (a higher layer parameter) SRS-ResourceSet (through higher layer signaling, RRC signaling, etc.) For each SRS resource set, a UE may be configured with SRS resources (a higher layer parameter SRS-resource). Here, K is a natural number and the maximum number of K is indicated by SRS capability.

Like DL BM, an UL BM procedure may be also classified into Tx beam sweeping of a terminal and Rx beam sweeping of a base station.

Figure 13:
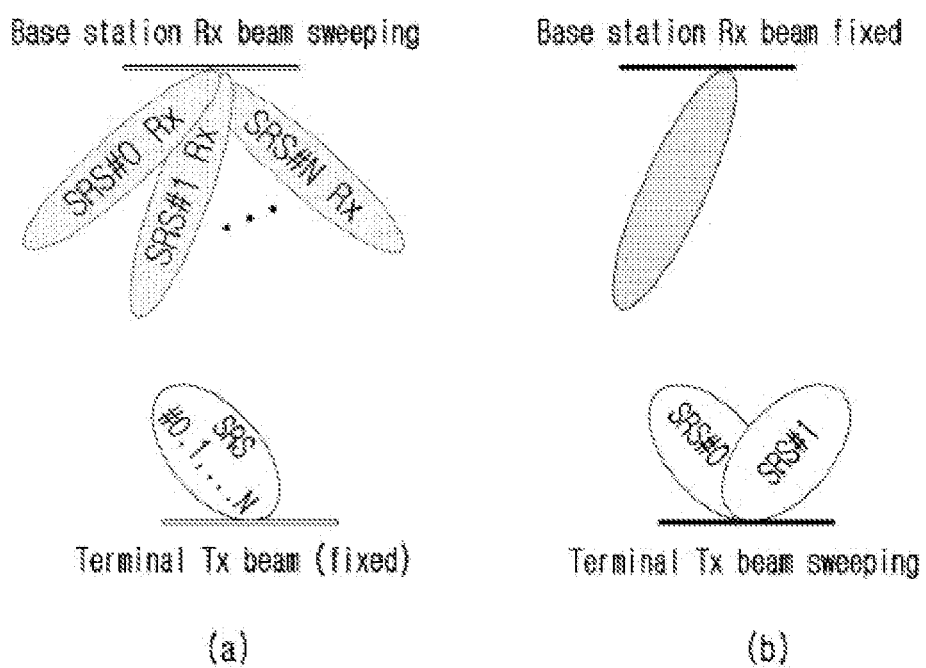
FIG. 13 is a diagram which illustrates an uplink beam management operation using SRS in a wireless communication system to which the present disclosure may be applied.

FIG. 13 is a diagram which illustrates an uplink beam management operation using SRS in a wireless communication system to which the present disclosure may be applied.

FIG. 13(a) illustrates a Rx beam determination operation of a base station and FIG. 13(b) illustrates a Tx beam sweeping operation of a terminal.

Figure 14:
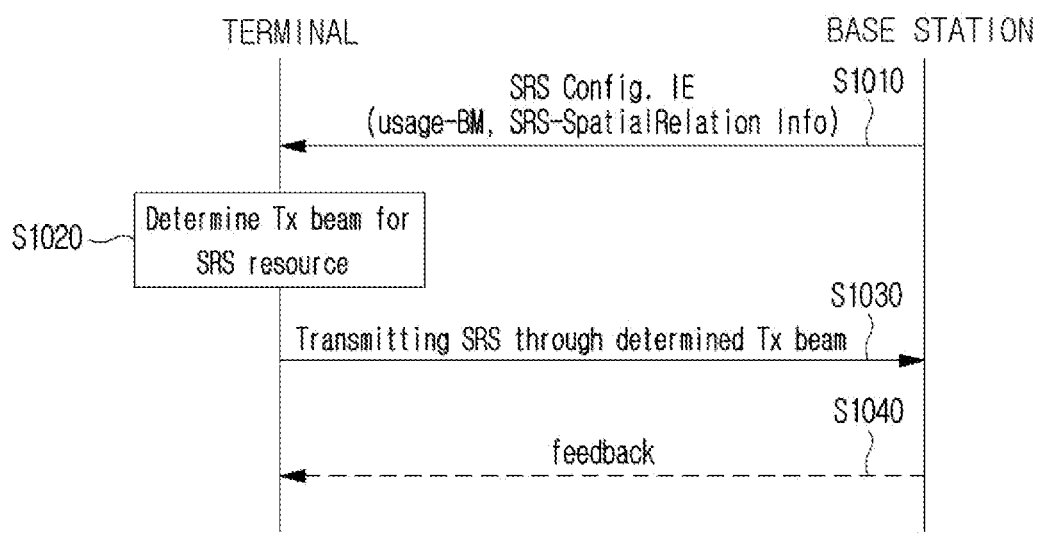
FIG. 14 is a diagram which illustrates an uplink beam management procedure in a wireless communication system to which the present disclosure may be applied.

FIG. 14 is a diagram which illustrates an uplink beam management procedure in a wireless communication system to which the present disclosure may be applied.

A terminal receives RRC signaling (e.g., an SRS-Config IE) including a (higher layer parameter) usage parameter configured as 'beam management' from a base station (S1010).

Table 8 represents an example of an SRS-Config IE (Information Element) and an SRS-Config IE is used for SRS transmission configuration. An SRS-Config IE includes a list of SRS-Resources and a list of SRS-ResourceSets. Each SRS resource set means a set of SRS-resources.

A network may trigger transmission of an SRS resource set by using configured aperiodicSRS-ResourceTrigger (L1 DCI).

TABLE 8

```
ASN1START
TAG-MAC-CELL-GROUP-CONFIG-START
SRS-Config ::=                          SEQUENCE {
srs-ResourceSetToReleaseList            SEQUENCE        (SIZE(1..maxNrofSRS-
ResourceSets)) OF SRS-ResourceSetId         OPTIONAL,   -- Need N
srs-ResourceSetToAddModList             SEQUENCE        (SIZE(1..maxNrofSRS-
ResourceSets)) OF SRS-ResourceSet           OPTIONAL,   -- Need N
srs-ResourceToReleaseList               SEQUENCE        (SIZE(1..maxNrofSRS-
Resources)) OF SRS-ResourceId               OPTIONAL,   -- Need N
srs-ResourceToAddModList                SEQUENCE        (SIZE(1..maxNrofSRS-
Resources)) OF SRS-Resource                 OPTIONAL,   -- Need N
tpc-Accumulation                        ENUMERATED {disabled}
                                            OPTIONAL, -- Need S
...
}
SRS-ResourceSet ::=                     SEQUENCE {
srs-ResourceSetId                       SRS-ResourceSetId,
srs-ResourceIdList                      SEQUENCE        (SIZE(1..maxNrofSRS-
ResourcesPerSet)) OF SRS-ResourceId         OPTIONAL, -- Cond Setup
resourceType                    CHOICE {
aperiodic                               SEQUENCE {
aperiodicSRS-ResourceTrigger            INTEGER (1..maxNrofSRS-TriggerStates-
1),
csi-RS                                  NZP-CSI-RS-ResourceId
                            OPTIONAL,   -- Cond NonCodebook
slotOffset                              INTEGER (1..32)
                            OPTIONAL,   -- Need S
...
},
semi-persistent                         SEQUENCE {
associatedCSI-RS                        NZP-CSI-RS-ResourceId
                            OPTIONAL,   -- Cond NonCodebook
...
},
periodic                                SEQUENCE {
associatedCSI-RS                        NZP-CSI-RS-ResourceId
                            OPTIONAL,   -- Cond NonCodebook
...
}
},
```

TABLE 8-continued

```
usage                           ENUMERATED {beamManagement, codebook,
nonCodebook, antennaSwitching},
alpha                           Alpha
                                OPTIONAL, -- Need S
p0                              INTEGER (-202..24)
                                OPTIONAL, -- Cond Setup
pathlossReferenceRS             CHOICE {
ssb-Index                         SSB-Index,
csi-RS-Index                      NZP-CSI-RS-ResourceId
SRS-SpatialRelationInfo ::=     SEQUENCE {
servingCellId                     ServCellIndex
    OPTIONAL, -- Need S
referenceSignal                 CHOICE {
ssb-Index                         SSB-Index,
csi-RS-Index                      NZP-CSI-RS-ResourceId,
srs                               SEQUENCE {
resourceId                          SRS-ResourceId,
uplinkBWP                           BWP-Id
}
}
}
}
SRS-ResourceId ::=              INTEGER (0..maxNrofSRS-Resources-1)
```

In Table 8, usage represents a higher layer parameter which indicates whether an SRS resource set is used for beam management or is used for codebook-based or non-codebook-based transmission. A usage parameter corresponds to a L1 parameter 'SRS-SetUse'. 'spatialRelation-Info' is a parameter which represents a configuration of a spatial relation between a reference RS and a target SRS. Here, a reference RS may be a SSB, a CSI-RS or a SRS corresponding to a L1 parameter 'SRS-SpatialRelationInfo'. The usage is configured per SRS resource set. A terminal determines a Tx beam for an SRS resource which will be transmitted based on SRS-SpatialRelation Info included in the SRS-Config IE (S1020). Here, SRS-SpatialRelation Info is configured per SRS resource and represents whether the same beam as a beam used in a SSB, a CSI-RS or a SRS will be applied per SRS resource. In addition, SRS-SpatialRelationInfo may be configured or may not be configured for each SRS resource.

If SRS-SpatialRelationInfo is configured for an SRS resource, the same beam as a beam used in a SSB, a CSI-RS or a SRS is applied and transmitted. But, if SRS-SpatialRelationInfo is not configured for an SRS resource, the terminal randomly determines a Tx beam and transmits an SRS through the determined Tx beam (S1030).

In more detail, for a P-SRS that 'SRS-ResourceConfig-Type' is configured as 'periodic':
  i) when SRS-SpatialRelationInfo is configured as 'SSB/PBCH', a UE transmits a corresponding SRS resource by applying the same spatial domain transmission filter (or generated by a corresponding filter) as a spatial domain Rx filter used for SSB/PBCH reception; or
  ii) when SRS-SpatialRelationInfo is configured as 'CSI-RS', a UE transmits a SRS resource by applying the same spatial domain transmission filter used for periodic CSI-RS or SP (semi-persistent) CSI-RS reception; or
  iii) when SRS-SpatialRelationInfo is configured as ' SRS', a UE transmits a corresponding SRS resource by applying the same spatial domain transmission filter used for periodic SRS transmission.

Although 'SRS-ResourceConfigType' is configured as 'SP(semi-persistent)-SRS' or 'AP(aperiodic)-SRS', a beam determination and transmission operation may be applied in a way similar to the above.

Additionally, a terminal may receive or may not receive a feedback on an SRS from a base station as in the following three cases (S1040).
  i) when Spatial_Relation_Info is configured for all SRS resources in a SRS resource set, a terminal transmits an SRS with a beam indicated by a base station. For example, when Spatial_Relation_Info indicates all the same SSB, CRI or SRI, a terminal repetitively transmits an SRS with the same beam. This case corresponds to FIG. 13(a) as a usage for a base station to select an Rx beam.
  ii) Spatial_Relation_Info may not be configured for all SRS resources in an SRS resource set. In this case, a terminal may transmit with freely changing SRS beams. In other words, this case corresponds to FIG. 13(b) as a usage for a terminal to sweep Tx beams.
  iii) Spatial_Relation_Info may be configured only for a part of SRS resources in an SRS resource set. In this case, for a configured SRS resource, an SRS may be transmitted with an indicated beam, and for a SRS resource that Spatial_Relation_Info is not configured an SRS may be transmitted by randomly applying a Tx beam by a terminal.

Quasi-Co Location (QCL)

An antenna port is defined so that a channel where a symbol in an antenna port is transmitted can be inferred from a channel where other symbol in the same antenna port is transmitted. When a property of a channel where a symbol in one antenna port is carried may be inferred from a channel where a symbol in other antenna port is carried, it may be said that 2 antenna ports are in a QC/QCL (quasi co-located or quasi co-location) relationship.

Here, the channel property includes at least one of delay spread, doppler spread, frequency/doppler shift, average received power, received timing/average delay, or a spatial RX parameter. Here, a spatial Rx parameter means a spatial (Rx) channel property parameter such as an angle of arrival.

A terminal may be configured at list of up to M TCI-State configurations in a higher layer parameter PDSCH-Config to decode a PDSCH according to a detected PDCCH having intended DCI for a corresponding terminal and a given serving cell. The M depends on UE capability.

Each TCI-State includes a parameter for configuring a quasi co-location relationship between ports of one or two DL reference signals and a DM-RS (demodulation reference signal) of a PDSCH.

A quasi co-location relationship is configured by a higher layer parameter qcl-Type1 for a first DL RS and qcl-Type2 for a second DL RS (if configured). For two DL RSs, a QCL type is not the same regardless of whether a reference is a same DL RS or a different DL RS.

A QCL type corresponding to each DL RS is given by a higher layer parameter qcl-Type of QCL-Info and may take one of the following values.
- 'QCL-TypeA': {Doppler shift, Doppler spread, average delay, delay spread}
- 'QCL-TypeB': {Doppler shift, Doppler spread}
- 'QCL-TypeC': {Doppler shift, average delay}
- 'QCL-TypeD': {Spatial Rx parameter}

For example, when a target antenna port is a specific NZP CSI-RS, it may be indicated/configured that a corresponding NZP CSI-RS antenna port is quasi-colocated with a specific TRS with regard to QCL-Type A and is quasi-colocated with a specific SSB with regard to QCL-Type D. A terminal received such indication/configuration may receive a corresponding NZP CSI-RS by using a doppler, delay value measured in a QCL-TypeA TRS and apply a Rx beam used for receiving QCL-TypeD SSB to reception of a corresponding NZP CSI-RS.

UE may receive an activation command by MAC CE signaling used to map up to 8 TCI states to a codepoint of a DCI field 'Transmission Configuration Indication'.

When HARQ-ACK corresponding to a PDSCH carrying an activation command is transmitted in a slot n, mapping indicated between a TCI state and a codepoint of a DCI field 'Transmission Configuration Indication' may be applied by starting from a slot $n+3N_{slot}^{subframe,\mu}+1$. After UE receives an initial higher layer configuration for TCI states before receiving an activation command, UE may assume for QCL-TypeA, and if applicable, for QCL-TypeD that a DMRS port of a PDSCH of a serving cell is quasi-colocated with a SS/PBCH block determined in an initial access process.

When a higher layer parameter (e.g., tci-PresentInDCI) indicating whether there is a TCI field in DCI configured for UE is set to be enabled for a CORESET scheduling a PDSCH, UE may assume that there is a TCI field in DCI format 1_1 of a PDCCH transmitted in a corresponding CORESET. When tci-PresentInDCI is not configured for a CORESET scheduling a PDSCH or when a PDSCH is scheduled by DCI format 1_0 and a time offset between reception of DL DCI and a corresponding PDSCH is equal to or greater than a predetermined threshold (e.g., timeDurationForQCL), in order to determine a PDSCH antenna port QCL, UE may assume that a TCI state or a QCL assumption for a PDSCH is the same as a TCI state or a QCL assumption applied to a CORESET used for PDCCH transmission. Here, the predetermined threshold may be based on reported UE capability.

When a parameter tci-PresentInDCI is set to be enabled, a TCI field in DCI in a scheduling CC (component carrier) may indicate an activated TCI state of a scheduled CC or a DL BWP. When a PDSCH is scheduled by DCI format 1_1, UE may use a TCI-state according to a value of a 'Transmission Configuration Indication' field of a detected PDCCH having DCI to determine a PDSCH antenna port QCL.

When a time offset between reception of DL DCI and a corresponding PDSCH is equal to or greater than a predetermined threshold (e.g., timeDurationForQCL), UE may assume that a DMRS port of a PDSCH of a serving cell is quasi-colocated with RS(s) in a TCI state for QCL type parameter(s) given by an indicated TCI state.

When a single slot PDSCH is configured for UE, an indicated TCI state may be based on an activated TCI state of a slot having a scheduled PDSCH.

When multiple-slot PDSCHs are configured for UE, an indicated TCI state may be based on an activated TCI state of a first slot having a scheduled PDSCH and UE may expect that activated TCI states across slots having a scheduled PDSCH are the same.

When a CORESET associated with a search space set for cross-carrier scheduling is configured for UE, UE may expect that a tci-PresentInDCI parameter is set to be enabled for a corresponding CORESET. When one or more TCI states are configured for a serving cell scheduled by a search space set including QCL-TypeD, UE may expect that a time offset between reception of a PDCCH detected in the search space set and a corresponding PDSCH is equal to or greater than a predetermined threshold (e.g., timeDurationForQCL).

For both of a case in which a parameter tci-PresentInDCI is set to be enabled and a case in which tci-PresentInDCI is not configured in a RRC connected mode, when a time offset between reception of DL DCI and a corresponding PDSCH is less than a predetermined threshold (e.g., timeDuration-ForQCL), UE may assume that a DMRS port of a PDSCH of a serving cell is quasi-colocated with RS(s) for QCL parameter(s) used for PDCCH QCL indication of a CORE-SET associated with a monitored search space having the lowest CORESET-ID in the latest slot where one or more CORESETs in an activated BWP of a serving cell is monitored by UE.

In this case, when QCL-TypeD of a PDSCH DMRS is different from QCL-TypeD of a PDCCH DMRS and they are overlapped in at least one symbol, UE may expect that reception of a PDCCH associated with a corresponding CORESET will be prioritized. It may be also applied to intra-band CA (carrier aggregation) (when a PDSCH and a CORESET exist in a different CC). When any of configured TCI states does not include QCL-TypeD, a different QCL assumption may be obtained from TCI states indicated for a scheduled PDSCH, regardless of a time offset between reception of DL DCI and a corresponding PDSCH.

For a periodic CSI-RS resource of configured NZP-CSI-RS-ResourceSet including a higher layer parameter trs-Info, UE may expect a TCI state to indicate one of the following QCL type(s).
- QCL-TypeC with a SS/PBCH block, and if applicable, QCL-TypeD with the same SS/PBCH block, or
- QCL-TypeC with a SS/PBCH block, and if applicable, QCL-TypeD with a CSI-RS resource in configured NZP-CSI-RS-ResourceSet including a higher layer parameter repetition For an aperiodic CSI-RS resource of configured NZP-CSI-RS-ResourceSet including a higher layer parameter trs-Info, UE may expect a TCI state to indicate QCL-TypeA with a periodic CSI-RS resource of NZP-CSI-RS-ResourceSet including a higher layer parameter trs-Info, and if applicable, QCL-TypeD with the same periodic CSI-RS resource.

For a CSI-RS resource of NZP-CSI-RS-ResourceSet configured without a higher layer parameter trs-Info and without a higher layer parameter repetition, UE may expect a TCI state to indicate one of the following QCL type(s).
- QCL-TypeA with a CSI-RS resource of configured NZP-CSI-RS-ResourceSet including a higher layer parameter trs-Info, and if applicable, QCL-TypeD with the same CSI-RS resource, or QCL-TypeA with a CSI-RS resource of configured NZP-CSI-RS-ResourceSet including a higher layer parameter trs-Info, and if applicable, QCL-TypeD with a SS/PBCH block, or QCL-TypeA with a CSI-RS resource of configured NZP-CSI-RS-ResourceSet including a higher layer parameter trs-Info, and if applicable, QCL-TypeD with a CSI-RS resource in configured NZP-CSI-RS-ResourceSet including a higher layer parameter repetition, or when QCL-TypeD is not applicable, QCL-TypeB with a CSI-RS resource in configured NZP-CSI-RS-ResourceSet including a higher layer parameter trs-Info.

For a CSI-RS resource of configured NZP-CSI-RS-ResourceSet including a higher layer parameter repetition, UE may expect a TCI state to indicate one of the following QCL type(s).

QCL-TypeA with a CSI-RS resource of configured NZP-CSI-RS-ResourceSet including a higher layer parameter trs-Info, and if applicable, QCL-TypeD with the same CSI-RS resource, or QCL-TypeA with a CSI-RS resource of configured NZP-CSI-RS-ResourceSet including a higher layer parameter trs-Info, and if applicable, QCL-TypeD with a CSI-RS resource in configured NZP-CSI-RS-ResourceSet including a higher layer parameter repetition, or QCL-TypeC with a SS/PBCH block, and if applicable, QCL-TypeD with the same SS/PBCH block.

For a DMRS of a PDCCH, UE may expect a TCI state to indicate one of the following QCL type(s).

QCL-TypeA with a CSI-RS resource of configured NZP-CSI-RS-ResourceSet including a higher layer parameter trs-Info, and if applicable, QCL-TypeD with the same CSI-RS resource, or QCL-TypeA with a CSI-RS resource of configured NZP-CSI-RS-ResourceSet including a higher layer parameter trs-Info, and if applicable, QCL-TypeD with a CSI-RS resource in configured NZP-CSI-RS-ResourceSet including a higher layer parameter repetition, or QCL-TypeA with a CSI-RS resource of NZP-CSI-RS-ResourceSet configured without a higher layer parameter trs-Info and without a higher layer parameter repetition, and if applicable, QCL-TypeD with the same CSI-RS resource.

For a DMRS of a PDSCH, UE may expect a TCI state to indicate one of the following QCL type(s).

QCL-TypeA with a CSI-RS resource of configured NZP-CSI-RS-ResourceSet including a higher layer parameter trs-Info, and if applicable, QCL-TypeD with the same CSI-RS resource, or QCL-TypeA with a CSI-RS resource of configured NZP-CSI-RS-ResourceSet including a higher layer parameter trs-Info, and if applicable, QCL-TypeD with a CSI-RS resource in configured NZP-CSI-RS-ResourceSet including a higher layer parameter repetition, or QCL-TypeA with a CSI-RS resource of NZP-CSI-RS-ResourceSet configured without a higher layer parameter trs-Info and without a higher layer parameter repetition, and if applicable, QCL-TypeD with the same CSI-RS resource.

Multiple TRP (M-TRP) Related Operation

Figure 15:
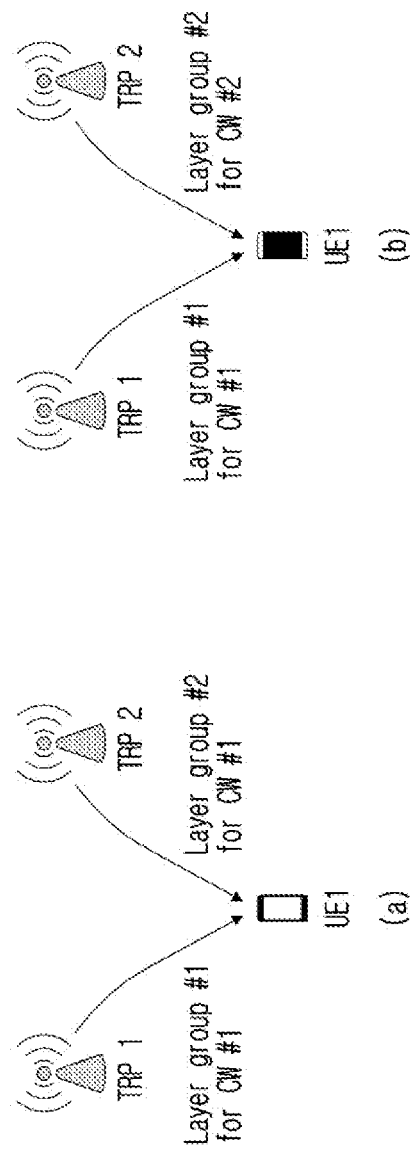
FIG. 15 illustrates a multiple Transmission and Reception Point (TRP) transmission scheme in a wireless communication system to which the present disclosure may be applied.

FIG. 15 illustrates a method of multiple TRPs transmission in a wireless communication system to which the present disclosure may be applied.

In reference to FIG. 15(a), it is shown a case in which layer groups transmitting the same codeword (CW)/transport block (TB) correspond to different TRPs. Here, a layer group may mean a predetermined layer set including one or more layers. In this case, there is an advantage that the amount of transmitted resources increases due to the number of a plurality of layers and thereby a robust channel coding with a low coding rate may be used for a TB, and additionally, because a plurality of TRPs have different channels, it may be expected to improve reliability of a received signal based on a diversity gain.

In reference to FIG. 15(b), an example that different CWs are transmitted through layer groups corresponding to different TRPs is shown. Here, it may be assumed that a TB corresponding to CW #1 and CW #2 in the drawing is identical to each other. In other words, CW #1 and CW #2 mean that the same TB is respectively transformed through channel coding, etc. into different CWs by different TRPs. Accordingly, it may be considered as an example that the same TB is repetitively transmitted. In case of FIG. 15(b), it may have a disadvantage that a code rate corresponding to a TB is higher compared to FIG. 15(a). However, it has an advantage that it may adjust a code rate by indicating a different RV (redundancy version) value or may adjust a modulation order of each CW for encoded bits generated from the same TB according to a channel environment.

According to methods illustrated in FIG. 15(a) and FIG. 15(b) above, probability of data reception of a terminal may be improved as the same TB is repetitively transmitted through a different layer group and each layer group is transmitted by a different TRP/panel. It is referred to as a SDM (Spatial Division Multiplexing) based M-TRP URLLC transmission method. Layers belonging to different layer groups are respectively transmitted through DMRS ports belonging to different DMRS CDM groups.

In addition, the above-described contents related to multiple TRPs are described based on an SDM (spatial division multiplexing) method using different layers, but it may be extended and applied to a frequency division multiplexing (FDM) method based on different frequency domain resources (e.g., RB/PRB (set), etc.) and/or a time division multiplexing (TDM) method based on different time domain resources (e.g., slots, symbols, sub-symbols, etc.).

Regarding a method for multiple TRPs based URLLC scheduled by single DCI, the following methods are discussed.

1) Method 1 (SDM): Time and Frequency Resource Allocation is Overlapped and n (n<=Ns) TCI States in a Single Slot 1-a) Method 1a.

The same TB is transmitted in one layer or layer set at each transmission time (occasion) and each layer or each layer set is associated with one TCI and one set of DMRS port(s).

A single codeword having one RV is used in all spatial layers or all layer sets. With regard to UE, different coded bits are mapped to a different layer or layer set by using the same mapping rule 1-b) Method 1b The same TB is transmitted in one layer or layer set at each transmission time (occasion) and each layer or each layer set is associated with one TCI and one set of DMRS port(s).

A single codeword having one RV is used in each spatial layer or each layer set. RV(s) corresponding to each spatial layer or each layer set may be the same or different.

1-c) Method 1c

The same TB having one DMRS port associated with multiple TCI state indexes is transmitted in one layer at one transmission time (occasion) or the same TB having multiple DMRS ports one-to-one associated with multiple TCI state indexes is transmitted in one layer.

In case of the above-described method 1a and 1c, the same MCS is applied to all layers or all layer sets.

2) Method 2 (FDM): Frequency Resource Allocation is Not Overlapped and n (n<=Nf) TCI States in a Single Slot Each non-overlapping frequency resource allocation is associated with one TCI state.

The same single/multiple DMRS port(s) are associated with all non-overlapping frequency resource allocation.

2-a) Method 2a

A single codeword having one RV is used for all resource allocation. With regard to UE, common RB matching (mapping of a codeword to a layer) is applied to all resource allocation.

2-b) Method 2b

A single codeword having one RV is used for each non-overlapping frequency resource allocation. A RV corresponding to each non-overlapping frequency resource allocation may be the same or different.

For the above-described method 2a, the same MCS is applied to all non-overlapping frequency resource allocation.

3) Method 3 (TDM): Time Resource Allocation is not Overlapped and n (n<=Nt1) TCI States in a Single Slot Each transmission time (occasion) of a TB has time granularity of a mini-slot and has one TCI and one RV.

A common MCS is used with a single or multiple DMRS port(s) at all transmission time (occasion) in a slot.

A RV/TCI may be the same or different at a different transmission time (occasion).

4) Method 4 (TDM): N (n<=Nt2) TCI States in K (n<=K) Different Slots

Each transmission time (occasion) of a TB has one TCI and one RV.

All transmission time (occasion) across K slots uses a common MCS with a single or multiple DMRS port(s).

A RV/TCI may be the same or different at a different transmission time (occasion).

Downlink Multiple TRP (M-TRP) URLLC Transmission Operation

DL MTRP URLLC transmission method means that multiple TRPs transmit the same data/DCI by using a different space (e.g., layer, port)/time/frequency resource. For example, TRP 1 transmits the specific data/DCI in resource 1 and TRP 2 transmits the specific data/DCI (i.e., same data/DCI) in resource 2

UE configured with a DL MTRP-URLLC transmission method receives the same data/DCI by using a different layer/time/frequency resource. Here, UE may receive an indication of the QCL RS/type (i.e., DL TCI state) used in the space/time/frequency resource for receiving the corresponding data/DCI from the base station.

For example, when the data/DCI is received in resource 1 and resource 2, a DL TCI state used in resource 1 and a DL TCI state used in resource 2 may be indicated. UE may achieve high reliability because it receives the data/DCI through resource 1 and resource 2. Such DL MTRP URLLC may be applied to a PDSCH/a PDCCH.

UL MTRP-URLLC transmission method means that multiple TRPs receive the same data/UCI from any UE by using a different space/time/frequency resource. For example, TRP 1 may receive the same data/DCI from UE in resource 1 and TRP 2 may receive the same data/DCI from UE in resource 2. And, TRP 1 and TRP 2 may share data/UCI received from the UE through a backhaul link (connected between TRPs).

That is, UE configured with a UL MTRP-URLLC transmission method may transmit the same data/UCI by using a different space/time/frequency resource. Here, the UE may be indicated by the base station for a Tx beam and Tx power (i.e., UL TCI state) to be used in space/time/frequency resources for transmitting the same data/UCI. For example, when the same data/UCI is transmitted in resource 1 and resource 2, the UE may be indicated by the base station to indicate the UL TCI state used in resource 1 and the UL TCI state used in resource 2 from the base station. This UL M-TRP URLLC may be applied to PUSCH/PUCCH.

In addition, in describing the present disclosure, when receiving/transmitting data/DCI/UCI through a specific space/time/frequency resource, using (or mapping) a specific TCI state (or TCI) may mean that, for DL, estimating a channel from the DMRS using the QCL type and QCL RS indicated by a specific TCI state in a specific space/time/frequency resource, and receiving/demodulating data/DCI/UCI with the estimated channel.

In addition, when receiving/transmitting data/DCI/UCI through a specific space/time/frequency resource, using (or mapping) a specific TCI state (or, TCI) may mean that, for UL, DMRS and data/UCI are transmitted/modulated using a Tx beam and/or Tx power indicated by a specific TCI state in a specific space/time/frequency resource.

And, the UL TCI state may include Tx beam or Tx power information of the UE. In addition, the base station may configure spatial relation information or the like for the UE through other parameters instead of the TCI state.

For example, the UL TCI state may be directly indicated to the UE through a UL grant DCI. Alternatively, the UL TCI state may mean spatial relationship information of an SRS resource indicated through an SRS resource indicator (SRI) field of a UL grant DCI. Alternatively, the UL TCI state may mean an open loop (OP) Tx power control parameter connected to a value indicated through the SRI field of the UL grant DCI.

Here, the OL Tx power control parameter may include, for example, j (index and alpha for OP parameter(s) Po (maximum 32 parameter values set per cell), q_d (index of DL RS resources for PL (path loss) measurement (up to 4 measurements per cell), or/and I (closed loop power control process index (up to 2 processes per cell)).

As another embodiment of the present disclosure, the M-TRP eMBB transmission method refers to a method in which M-TRP transmits different data/DCI using different space/time/frequency resources. If the M-TRP eMBB transmission method is configured, it may be assumed that the UE receives a plurality of TCI states from the base station through DCI, and that data received using QCL RSs indicated by each of the plurality of TCI states are different from each other.

In addition, since the RNTI for M-TRP URLLC and the M-TRP eMBB RNTI are separately used, the UE may determine whether a specific transmission/reception is M-TRP URLLC transmission/reception or M-TRP eMBB transmission/reception. For example, when RNTI for URLLC is used and CRC masking is performed for DCI, the UE may determine the corresponding transmission as URLLC transmission. In addition, when the RNTI for eMBB is used and CRC masking is performed for DCI, the UE may determine the corresponding transmission as eMBB transmission. As another example, the base station may configure the M-TRP URLLC transmission/reception method or the M-TRP eMBB transmission/reception method to the UE through new signaling.

For convenience of description of the present disclosure, it has been assumed that 2 TRPs cooperate with each other to perform a transmission/reception operation, but the present disclosure is not limited thereto. That is, the present disclosure may be extended and applied even in a multi-TRP environment of 3 or more, and may be extended and applied even in an environment in which transmission/reception is performed in different panels or beams in the same TRP. The UE may recognize different TRPs as different TCI states. That the UE transmits/receives data/DCI/UCI using TCI state 1 means that it transmits/receives data/DCI/UCI/from TRP 1 (or to TRP 1).

The present disclosure may be utilized in a situation in which the M-TRP cooperatively transmits the PDCCH (repetitively transmits or divides the same PDCCH). In addition, the present disclosure may be utilized in a situation in which M-TRP cooperatively transmits PDSCH or cooperatively receives PUSCH/PUCCH.

In addition, in describing the present disclosure, repeatedly transmitting the same PDCCH by a plurality of base stations (M-TRP) may mean transmitting the same DCI through a plurality of PDCCH candidates and has the same meaning that multiple base stations repeatedly transmit the same DCI. Here, two DCIs having the same DCI format/size/payload may be viewed as the same DCI.

Alternatively, if the scheduling results are the same even if the payloads of the two DCIs are different, the two DCIs may be regarded as the same DCI. For example, the time domain resource allocation (TDRA) field of DCI may relatively determine the slot/symbol position of data and the slot/symbol position of A(ACK)/N(NACK) based on the reception time of the DCI.

In this case, when the DCI received at time n and the DCI received at time n+1 indicate the same scheduling result to the UE, the TDRA fields of the two DCIs are different, and as a result, the DCI payload is different from each other. Accordingly, even if the payloads of the two DCIs are different, if the scheduling results are the same, the two DCIs may be regarded as the same DCI. Here, the number of repetitions R may be directly indicated by the base station to the UE or mutually promised.

Alternatively, even if the payloads of the two DCIs are different and the scheduling results are not the same, when the scheduling result of one DCI is a subset of the scheduling result of the other DCI, the two DCIs may be regarded as the same DCI.

For example, if the same data is TDM and repeatedly transmitted N times, DCI 1 received before the first data indicates (or schedules) repetition of data N times, and DCI 2 received before the second data indicates repetition (scheduling) of data N−1. In this case, the scheduling result (or data) of DCI 2 becomes a subset of the scheduling result (or data) of DCI 1, and both DCIs have scheduling results for the same data. Accordingly, even in this case, the two DCIs may be regarded as the same DCI.

And, in describing the present disclosure, dividing and transmitting the same PDCCH by a plurality of base stations may mean that one DCI is transmitted through one PDCCH candidate, but TRP 1 transmits some resources defined for the corresponding PDCCH candidate and TRP 2 transmits the remaining resources.

For example, when TRP 1 and TRP 2 divide and transmit PDCCH candidates corresponding to aggregation level m1+m2, a PDCCH candidate may be divided into PDCCH candidate 1 corresponding to aggregation level m1 and PDCCH candidate 2 corresponding to aggregation level m2, TRP 1 may transmit PDCCH candidate 1, and TPR 2 may transmit PDCCH candidate 2. In this case, TRP 1 and TRP 2 may transmit PDCCH candidate 1 and PDCCH candidate 2 using different time/frequency resources. After receiving the PDCCH candidate 1 and the PDCCH candidate 2, the UE may generate a PDCCH candidate corresponding to the aggregation level m1+m2 and attempt DCI decoding.

In this case, the method in which the same DCI is divided and transmitted to several PDCCH candidates may be implemented in the following two methods.

The first method is a method in which DCI payload (e.g., control information+CRC) is encoded through one channel encoder (e.g., polar encoder) and divided into two TRPs and transmitted. That is, the first method means a method of dividing and transmitting the coded bits obtained according to the encoding result in two TRPs. Here, the entire DCI payload may be encoded in the coded bit transmitted by each TRP, but is not limited thereto, and only some DCI payloads may be encoded.

The second method divides the DCI payload (e.g., control information+CRC) into two DCIs (DCI 1 and DCI 2) and encodes each of them through a channel encoder (e.g., a polar encoder). Thereafter, each of the two TRPs may transmit a coded bit corresponding to DCI 1 and a coded bit corresponding to DCI 2 to the terminal.

That is, dividing/repeating the same PDCCH by a plurality of base stations (M-TRP) and transmitting over a plurality of monitoring occasions (MOs) may mean that 1) the coded bit encoding the entire DCI content of the corresponding PDCCH is repeatedly transmitted through each MO for each base station (S-TRP), 2) the coded bit encoding the entire DCI content of the corresponding PDCCH is divided into a plurality of parts, and each base station (S-TRP) transmits different parts through each MO, or 3) the DCI content of the corresponding PDCCH is divided into a plurality of parts, and different parts are encoded for each base station (S-TRP) (that is, separately encoded) and transmitted through each MO.

Repeatedly/split transmission of the PDCCH may be understood as transmitting the PDCCH multiple times over several transmission occasions (TO).

Here, TO may mean a specific time and/or frequency resource unit in which the PDCCH is transmitted. For example, when the PDCCH is transmitted multiple times (to a specific RB) over slots 1, 2, 3, and 4, TO may mean each slot. As another example, if the PDCCH is transmitted multiple times (in a specific slot) over RB sets 1, 2, 3, and 4, TO may mean each RB set. As another example, if the PDCCH is transmitted multiple times over different times and frequencies, TO may mean each time/frequency resource. In addition, the TCI state used for DMRS channel estimation may be set differently for each TO, and it may be assumed that the TOs in which the TCI state is set differently are transmitted by different TRPs/panels.

Repeatedly transmitting or dividing the PDCCH by a plurality of base stations may mean that the PDCCH is transmitted over multiple TOs, and the union of the TCI states configured in the corresponding TOs consists of two or more TCI states. For example, PDCCH transmitting over TO 1,2,3,4 may mean that TCI states 1,2,3,4 are configured in each of TO 1,2,3,4 and TRP i cooperatively transmits the PDCCH in TO i.

In describing the present disclosure, repeatedly transmitting the same PUSCH to a plurality of base stations (i.e., M-TRP) by the UE may mean that the UE transmits the same data through a plurality of PUSCHs, and each PUSCH may be transmitted by being optimized for UL channels of different TRPs.

For example, the UE may repeatedly transmit the same data through PUSCH 1 and PUSCH 2. In this case, PUSCH 1 may be transmitted using UL TCI state 1 for TRP 1, and link adaptation such as precoder/MCS may also be scheduled to receive a value optimized for the channel of TRP 1 to transmit the PUSCH. PUSCH 2 is transmitted using UL TCI state 2 for TRP 2, and link adaptation such as a precoder/MCS may also be scheduled for a value optimized for the channel of TRP 2 to transmit the PUSCH. In this case, the repeatedly transmitted PUSCH 1 and PUSCH 2 may be transmitted at different times to be TDM, FDM, or SDM.

In addition, in describing the present disclosure, transmitting, by UE to a plurality of base stations (i.e., M-TRP), the same PUSCH by dividing it may mean that one data is transmitted through one PUSCH, but the resources allocated to the PUSCH are divided and optimized for UL channels of different TRPs for transmission.

For example, the UE may transmit the same data through a 10-symbol PUSCH. At this time, the first 5 symbols among 10 symbols may be transmitted using UL TCI state 1 for TRP 1, and the UE may transmit a 5-symbol PUSCH (to TRP 1) by receiving a link adaptation such as precoder/MCS and scheduling a value optimized for a channel of TRP 1. The remaining 5 symbols may be transmitted using UL TCI state 2 for TRP 2, and the UE may transmit the remaining 5-symbol PUSCH (with TRP 2) by receiving a link adaptation such as precoder/MCS and scheduling a value optimized for the channel of TRP 2.

In the above example, a method of dividing one PUSCH into time resources and performing TDM transmission for TRP 1 and TRP 2 has been described. However, the present disclosure is not limited thereto, and the UE may divide and transmit the same PUSCH to a plurality of base stations by using the FDM/SDM method.

The UE may repeatedly transmit the PUCCH to a plurality of base stations (similar to PUSCH transmission) or divide and transmit the same PUCCH.

And, when a plurality of TOs are indicated for the terminal in order to repeatedly transmit PDCCH/PDSCH/PUSCH/PUCCH or divide and transmit PDCCH/PDSCH/PUSCH/PUCCH, for each TO, UL may be transmitted toward a specific TRP, or DL may be received from a specific TRP. At this time, the UL TO (or the TO of TRP 1) transmitted toward TRP 1 may mean a TO using a first value of two spatial relations, two UL TCIs, two UL power control parameters or two pathloss (PL)-RS indicated to the terminal. And, UL TO (or TO of TRP 2) transmitted toward TRP 2 may mean a TO using a second value of two spatial relations, two UL TCIs, two UL power control parameters, or two PL-RSs indicated to the UE.

Similarly, in the case of DL transmission, the DL TO transmitted by TRP 1 (or TO of TRP 1) may mean a TO using a first value of two DL TCI states indicated to the terminal (e.g., when two TCI states are set in CORESET), and the DL TO transmitted by TRP 2 (or TO of TRP 2) may mean a TO using a second value of two DL TCI states indicated to the terminal (e.g., two TCI states are set in CORESET).

The present disclosure may be extended and applied to various channels such as PUSCH/PUCCH/PDSCH/PDCCH. In addition, the present disclosure may be extended and applied to both the case of repeatedly transmitting the channel and the case of dividing and transmitting the channel in different space/time/frequency resources.

In addition, in terms of the DCI transmission, the M-TRP transmission scheme may be divided into i) a multiple DCI (M-DCI)-based M-TRP transmission scheme in which each TRP transmits a different DCI, and ii) a single DCI (S-DCI)-based M-TRP transmission scheme in which one TRP transmits a DCI. For example, in the case of S-DCI, since all scheduling information for data transmitted by the M-TRP need to be transferred through one DCI, it may be used in an ideal BackHaul (ideal BH) environment where dynamic cooperation between two TRPs is possible.

Related to Enhanced M-TRP Transmission and Reception

With respect to M-TRP transmission/reception in Rel-16 NR standardization, PDSCH transmission/reception according to the S-DCI based M-TRP transmission scheme and the M-DCI based M-TRP transmission scheme is supported.

First, an S-DCI based M-TRP PDSCH transmission scheme will be described.

One of SDM/FDM/TDM schemes may be used for S-DCI based M-TRP PDSCH transmission. In the case of SDM, the base station transmits one TB using a multi-layer, but transmits layers belonging to different DMRS CDM groups with different Tx beams (i.e., QCL RS or TCI state). Through this, the transmission capacity may be improved by increasing the number of layers compared to the existing S-TRP transmission scheme. In addition, when one TB is transmitted using multiple layers, some layers are transmitted to TRP 1 and the other layers are transmitted to TRP 2, whereby channel reliability due to diversity gain may be improved.

In the case of FDM, scheme 2a and 2b are supported. Here, scheme 2a is a scheme in which one TB is transmitted using a multi-RB, but RBs belonging to different RB groups are transmitted using different Tx beams (i.e., QCL RS or TCI state). Scheme 2b is a scheme for transmitting the same TB using different RB groups, but transmitting RBs belonging to different RB groups using different Tx beams (i.e., QCL RS or TCI state). In the case of TDM, schemes 3 and 4, are supported. Here, scheme 4 (i.e., inter-slot TDM) is a scheme for repeatedly transmitting the same TB in several slots, but transmitting slots belonging to different slot groups using different Tx beams (i.e., QCL RS or TCI state). On the other hand, Scheme 3 (i.e., intra-slot TDM) is a scheme for repeatedly transmitting the same TB in several OFDM symbol groups, but transmitting some OFDM symbol groups and the remaining OFDM symbol groups using different Tx beams (i.e., QCL RS or TCI state).

Next, an M-DCI based M-TRP PDSCH transmission scheme will be described.

M-DCI based MTRP PDSCH transmission is a scheme in which each TRP schedules and transmits a PDSCH through DCI. That is, TRP 1 transmits PDSCH 1 through DCI 1, and TRP 2 transmits PDSCH 2 through DCI 2. When PDSCH 1 and PDSCH 2 overlap on the same frequency and time resource, since two PDSCHs are received for the same RE, resource efficiency is increased and transmission capacity is increased. For this, the concept of a CORESET pool, which means a group of several CORESETs, has been introduced. For example, TRP 1 transmits a PDCCH through CORESET belonging to CORESET pool 0, and also transmits a PDSCH scheduled by the corresponding PDCCH. TRP 2 transmits a PDCCH through CORESET belonging to CORESET pool 1, and also transmits a PDSCH scheduled by the corresponding PDCCH.

Even in the case of PUSCH, a specific TRP may schedule PUSCH transmission to the UE through CORESET belonging to each CORESET pool. For example, some PUCCH resources may be scheduled by TRP 1, and the remaining PUCCH resources may be scheduled by TRP 2. The UE may transmit an independent PUSCH/PUCCH for each of TRPs 1 and 2.

In addition, the UE may recognize a PUSCH (or PUCCH) scheduled by DCI received based on different CORESETs (or CORESETs belonging to different CORESET groups) as a PUSCH (or PUCCH) transmitted to different TRPs or as a PUSCH (or PUCCH) of a different TRP. In addition, the scheme for UL transmission (e.g., PUSCH/PUCCH) transmitted to different TRPs may be equally applied to UL transmission transmitted to different panels belonging to the same TRP.

In addition, the CORESET group ID (or CORESET pool index with the same meaning) described/mentioned in the present disclosure may mean index/identification information (e.g., ID) for distinguishing CORESET for each TRP/panel. In addition, the CORESET group may mean a group/union of CORESETs distinguished by index/identification information (e.g., ID)/CORESET group ID for distinguishing CORESETs for each TRP/panel. As an example, the CORESET group ID may be specific index information defined in CORESET configuration. That is, the CORESET group may be configured/indicated/defined by the index defined in the CORESET configuring for each CORESET. And/or, the CORESET group ID may mean an index/identification information/indicator for classification/identification between CORESETs configured/related to each TRP/panel.

CORESET group ID described/mentioned in this disclosure may be expressed by being replaced with a specific index/specific identification information/specific indicator for classification/identification between CORESETs set/associated with each TRP/panel. Corresponding information may be configured/indicated through higher layer signaling (e.g., RRC signaling, MAC-CE, etc.) and/or physical layer signaling (e.g., DCI). As an example, it may be configured/indicated to perform PDCCH detection for each TRP/panel in a corresponding CORESET group unit, and UCI (e.g., CSI, HARQ-ACK/NACK, SR, etc.) for each TRP/panel in a corresponding CORESET group unit. And/or uplink physical channel resources (e.g., PUCCH/PRACH/SRS resources) may be configured/indicated to be managed/controlled separately. And/or, HARQ ACK/NACK (process/retransmission) for PDSCH/PUSCH, etc. scheduled for each TRP/panel in units of the corresponding CORESET group may be managed.

For example, the higher layer parameter ControlResourceSet IE (information element) is used to configured a time/frequency control resource set (control resource set, CORESET). The corresponding CORESET may be related to detection/reception of downlink control information. The ControlResourceSet IE may include a CORESET-related ID (e.g., controlResourceSetID)/CORESET pool index for CORESET (e.g., CORESETPoolIndex)/time/frequency resource setting of CORESET/TCI information related to CORESET. As an example, the index of the CORESET pool (e.g., CORESETPoolIndex) may be configured to 0 or 1. In the above description in the present disclosure, a CORESET group may correspond to a CORESET pool, and a CORESET group ID may correspond to a CORESET pool index (e.g., CORESETPoolIndex). The aforementioned ControlResourceSet (ie, CORESET) may be configured through higher layer signaling (e.g., RRC signaling).

Additionally, in relation to M-TRP transmission and reception in Rel-17 NR standardization, M-TRP PDCCH/PDSCH SFN transmission, S-DCI based M-TRP PUSCH repetition transmission, and single PUCCH resource based M-TRP PUCCH repetition transmission are supported. In the transmission schemes, the same contents (i.e., DCI/UL TB/UCI, etc.) are repeatedly transmitted by improving the URLLC target for increasing reliability. Here, M-TRP PDCCH repetition transmission is performed based on TDM or FDM, M-TRP PDCCH/PDSCH SFN transmission is performed in the same time/frequency/layer, and S-DCI based M-TRP PUSCH repetition transmission is performed based on TDM, and a single PUCCH resource based M-TRP PUCCH repetition transmission is performed based on TDM.

First, the S-DCI based M-TRP PDCCH repetition transmission scheme will be described.

In NR Rel-17 standardization, a plurality of CORESETs in which different TCI states (i.e., different QCL RSs) are configured for M-TRP PDCCH repetition transmission are configured to the terminal, and a plurality of SS sets respectively connected to the corresponding CORESETs are configured. The base station may indicate/configured that the SS set connected to one CORESET and the SS set connected to another CORESET are linked for repetition transmission to the terminal. Through this, the terminal may recognize that PDCCH candidates of the corresponding SS set are repeatedly transmitted.

For example, two CORESETs, CORESET 0 and CORESET 1, may be configured to the terminal, CORESET 0 and CORESET 1 may be connected to SS set 0 and SS set 1, respectively, and SS set 0 and SS set 1 may be linked. The terminal may recognize that the same DCI is repeatedly transmitted in the PDCCH candidate of SS set 0 and the PDCCH candidate of SS set 1, and based on a specific rule, the terminal may recognize that the specific PDCCH candidate of SS set 0 and the specific PDCCH candidate of SS set 1 correspond to a pair configured for repeatedly transmitting the same DCI. The two PDCCH candidates may be referred to as linked PDCCH candidates, and when the terminal properly receives any one of the two PDCCH candidates, the corresponding DCI may be successfully decoded. However, when receiving the PDCCH candidate of SS set 0, the terminal may use the QCL RS (i.e., DL beam) of the TCI state of CORESET 0 connected to SS set 0, and when receiving the PDCCH candidate of SS set 1, the terminal may use the QCL RS (ie, DL beam) of the TCI state of CORESET 1 connected to SS set 1. Accordingly, the terminal receives the associated PDCCH candidates using different beams.

Next, the M-DCI based M-TRP PDCCH repetition transmission scheme will be described.

As one of the M-TRP PDCCH repetition transmission types, a plurality of TRPs may repeatedly transmit the same DCI through the same time/frequency/DMRS port, and such a transmission method may be referred to as SFN PDCCH transmission. However, for SFN PDCCH transmission, the base station configures a plurality of TCI states in one CORESET instead of configuring a plurality of CORESETs in which different TCI states are configured. When the terminal receives the PDCCH candidate through the SS set connected to the one CORESET, the terminal may perform channel estimation of the PDCCH DMRS and attempt decoding by using all of the plurality of TCI states.

In addition, during the above-described M-TRP PDSCH repetition transmission, the two TRPs repeatedly transmit the corresponding channel to different resources. However, when the resources used by the two TRPs are the same, that is, when the same channel is repeatedly transmitted through the same frequency/time/layer (i.e., DMRS port), the reliability of the corresponding channel may be improved. In this case, since the same channel repeatedly transmitted is received while being transmitted (i.e., air) because the resources are not distinguished, it may be recognized as one channel (e.g., a composite channel) from a reception side (e.g., terminal). For SFN PDSCH transmission, two DL TCI states for PDSCH DMRS reception may be configured in the terminal.

Next, the S-DCI based M-TRP PUSCH repetition transmission scheme will be described.

In NR Rel-17 standardization, the base station configured two SRS sets to the terminal for S-DCI based M-TRP PUSCH transmission, and each set is used for indicating UL beam/QCL information for a UL Tx port for TRP 1 and TRP 2. In addition, the base station may indicate the SRS resource for each SRS resource set through two SRI fields included in one DCI, and may indicate up to two PC parameter sets. For example, the first SRI field may indicate the SRS resource and PC parameter set defined in SRS resource set 0, and the second SRI field may indicate the SRS resource and PC parameter set defined in SRS resource set 1. The terminal may be indicated with UL Tx port, PC parameter set, and UL beam/QCL information for TRP 1 through the first SRI field, and through this, the terminal performs PUSCH transmission in the TO corresponding to SRS resource set 0. Similarly, the terminal may be indicated with UL Tx port, PC parameter set, and UL beam/QCL information for TRP 2 through the second SRI field, and through this, the terminal performs PUSCH transmission in the TO corresponding to SRS resource set 1.

Next, the Single PUCCH resource based M-TRP PUCCH repetition transmission scheme will be described.

In NR Rel-17 standardization, the base station may activate/configure two spatial relation info on a single PUCCH resource to the terminal for the Single PUCCH resource based M-TRP PUCCH transmission (if FR1, enable/configure two PC parameter sets). When UL UCI is transmitted through the corresponding PUCCH resource, each spatial relation info is used to indicate to the terminal the spatial relation info for TRP 1 and TRP 2, respectively. For example, through the value indicated in the first spatial relation info, the terminal is indicated with Tx beam/PC parameter(s) toward TRP 1, and the terminal perform PUCCH transmission in TO corresponding to TRP 1 using corresponding information. Similarly, through the value indicated in the second spatial relation info, the terminal is indicated with Tx beam/PC parameter(s) toward TRP 2, and the terminal performs PUCCH transmission in the TO corresponding to TRP 2 using the corresponding information.

In addition, for M-TRP PUCCH repetition transmission, the configuring scheme is improved so that two spatial relation info may be configured in the PUCCH resource. That is, when power control (PC) parameters such as PLRS, Alpha, P0, and Closed loop index are set in each spatial relation info, spatial relation RS may be configured. As a result, PC information and spatial relation RS information corresponding to two TRPs may be configured through two spatial relation info. Through this, the terminal transmits UCI (i.e., CSI, ACK/NACK, SR, etc.) PUCCH in the first TO using the first spatial relation info, and transmits the same UCI PUCCH in the second TO using the second spatial relation info. In the present disclosure, a PUCCH resource in which two spatial relation info is configured is referred to as an M-TRP PUCCH resource, and a PUCCH resource in which one spatial relation info is configured is referred to as an S-TRP PUCCH resource.

In the overall description and/or proposed method of the present disclosure, the meaning of using/mapping a specific TCI state (or TCI) when transmitting/receiving data/DCI/UCI for a certain frequency/time/spatial resource may mean, in the case of DL, estimating a channel from the DMRS using the QCL type and QCL RS indicated by the corresponding DL TCI state in the corresponding frequency/time/spatial resource and receiving/demodulating the estimated data/DCI. In addition, in the case of UL, the corresponding meaning may mean transmitting/modulating DMRS and data/UCI using the Tx beam and/or Tx power indicated by the UL TCI state in the corresponding frequency/time/spatial resource.

Here, the UL TCI state may include information for the Tx beam and/or Tx power of the terminal, and spatial relation info, etc. may be configured to the terminal through other parameters instead of the TCI state. The UL TCI state may be directly indicated by the UL grant DCI, and may mean spatial relation info of the SRS resource indicated through the SRI field of the UL grant DCI. Alternatively, the UL TCI state is an Open Loop (OL) Tx power control parameter (e.g., j: index for open loop parameters Po & alpha (maximum 32 parameter value sets per cell), q_d: index of DL RS resource for PL measurement (maximum 4 measurements per cell), 1: may mean closed loop power control process index (maximum 2 processes per cell)) connected to a value indicated through the SRI field of the UL grant DCI. In addition, the UL TCI state may be indicated through DL grant DCI as well as UL grant DCI.

In the present disclosure, for convenience of explanation, the proposed method(s) was applied assuming cooperative transmission/reception between 2 TRPs, but the proposed method(s) may be extended and applied even in a multi-TRP environment of 3 or more, and multiple It may be extended and applied even in the panel environment. Here, different TRPs may be recognized by the terminal as different TCI states, and when the terminal transmits and receives data/DCI/UCI using the first TCI state (i.e., TCI state 1), it may mean transmitting and receiving data/DCI/UCI to/from first TRP (i.e., TRP 1).

In the present disclosure, TO (Transmission Occasion) may mean each channel transmitted at different times when multiple channels are TDMed, and when multiple channels are FDM, it may mean each channel transmitted at different frequencies/RBs, and when multiple channels are SDM, it may mean each channel transmitted to a different layer/beam/DMRS port. One TCI state may be mapped to each TO. When the same channel is repeatedly transmitted, intact data/DCI/UCI is transmitted to one TO, and the receiving side may receive multiple TOs and then the reception success rate may be increased.

Figure 16:
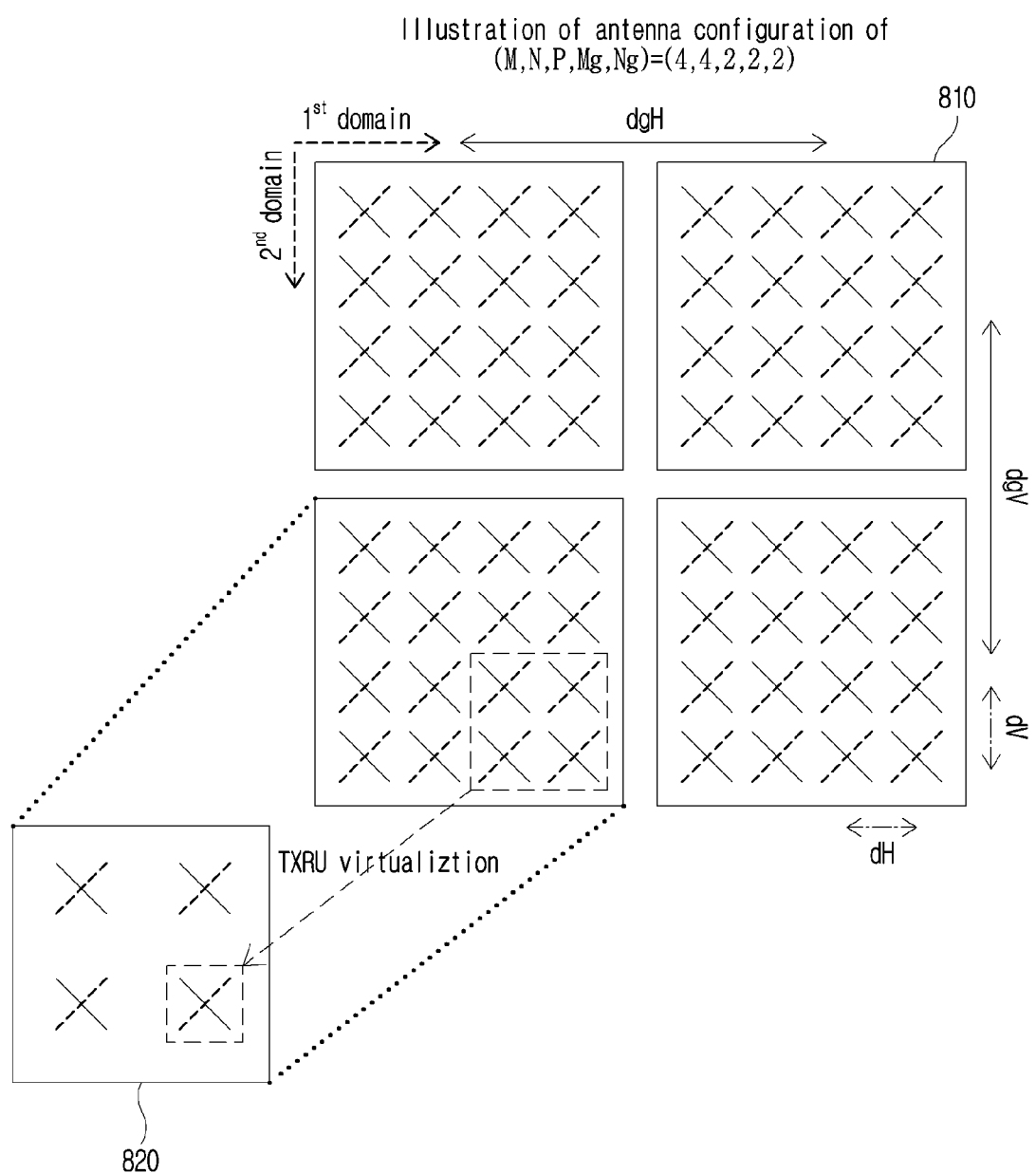
FIG. 16 illustrates an antenna configuration and a port configuration in a panel in a wireless communication system to which the present disclosure may be applied.

FIG. 16 illustrates an antenna configuration and a port configuration in a panel in a wireless communication system to which the present disclosure may be applied.

Referring to FIG. 16, an antenna configuration 810 may be configured for a first domain ($1^{st}$ domain) and a second domain ($2^{nd}$ domain), and TXRU virtualization may be applied in relation to an antenna configuration 810 and a port configuration 820.

With respect to the antenna configuration 810, M means the number of columns in the panel (i.e., the number of antenna ports in the first domain in the panel), and N is the number of rows in the panel (i.e., the number of antenna ports in the second domain within the panel), P means polarization (1: co-pol, 2:X-pol), Mg means the number of panels in the first domain, and Ng means the number of panels in the second domain. Accordingly, the total number of antenna elements may be expressed as P*M*N*Mg*Ng. For example, the antenna configuration 810 shown in FIG. 8 corresponds to [(M, N, P, Mg, Ng)=(4, 4, 2, 2, 2)]. In FIG. 8, dgH means panel spacing in the first domain, dgV means channel spacing in the second domain, dH means antenna spacing in the first domain, and, dV means an antenna spacing in the second domain.

With respect to the panel configuration 820, N1 means the number of columns in the first domain (i.e., the number of antenna ports in the first domain within the panel), and N2 means the number of rows in the second domain (i.e., the number of antenna ports in the second domain within the panel), and P means polarization (1: co-pol, 2: X-pol). Accordingly, the total number of CSI-RS ports in the panel may be expressed as P*N1*N2. For example, the panel configuration 820 illustrated in FIG. 8 corresponds to [(N1, N2, P)=(2, 2, 2)].

Interference Mitigation Method Based on Sounding Reference Signal (SRS) Transmission and Reception In the present disclosure, when a plurality of base stations or a base station having a plurality of panels transmits and receives channels/signals with a terminal based on a coherent joint transmission (CJT) scheme, a method for configuring/indicating SRS transmission and reception to improve the transmission and reception performance will be described.

In the case of the CJT scheme in the present disclosure, it may be assumed that cooperative transmission is performed in a state in which a plurality of base stations are connected through an ideal backhaul and synchronization between base stations is matched.

In addition, a base station described in the present disclosure may perform transmission and reception of a channel/signal with a terminal based on the above-described CJT scheme, and may correspond to at least one of the plurality of base stations or a base station having the plurality of panels, etc. In addition, a corresponding base station may be interpreted as one TRP, may include a plurality of TRPs, or may correspond to a cell including a plurality of TRPs.

For example, as described above, when a base station transmits a downlink channel/signal to a terminal based on the CJT scheme, in order to improve performance of the downlink channel/signal transmission, an improved beamformed SRS may be required. Here, beamforming may include analog beamforming or digital beamforming. That is, the beamformed SRS may refer to an SRS that is transmitted by forming a specific beam based on implementation of the terminal and/or configuration/instruction of the base station.

In this regard, in the present disclosure, a scenario in which a downlink channel/signal may be obtained based on reciprocity (such as time division duplex (TDD)) may be considered.

Figure 17:
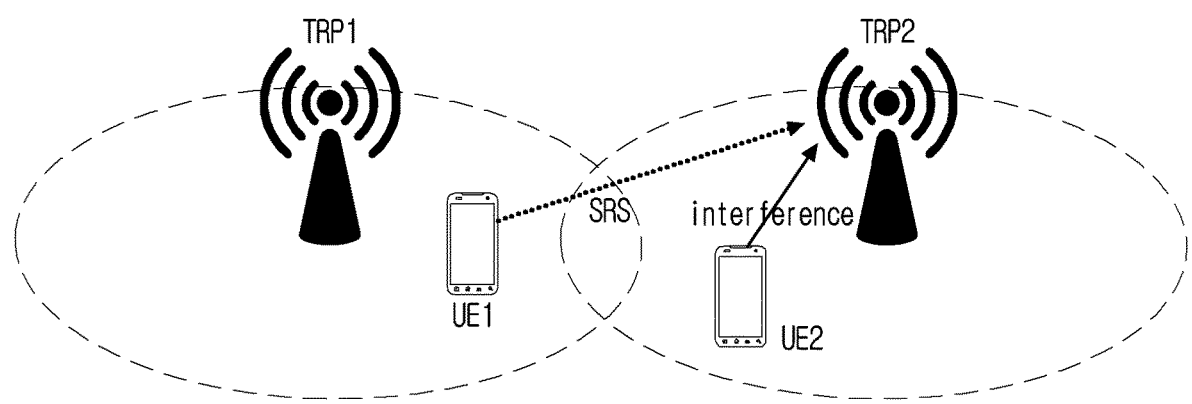
FIG. 17 illustrates uplink interference in a wireless communication system to which the present disclosure may be applied.

FIG. 17 illustrates uplink interference in a wireless communication system to which the present disclosure may be applied.

Referring to FIG. 17, a case in which cooperative transmission is performed between TRPs (TRP 1 and TRP 2) and UEs (UE 1 and UE 2) is considered.

At this time, when UE 1 performs SRS transmission in order for TRP 2 to acquire a channel of UE 1 (i.e., channel acquisition based on reciprocity), and uplink transmission of UE 2 adjacent to TRP 2 may act as interference. That is, uplink transmission of UE 2 may act as strong interference for channel measurement between TRP 2 and UE 1.

In particular, in order to smoothly perform downlink transmission based on the CJT scheme described above, base stations need to know channel information, and difficulties in channel acquisition may occur due to interference as in the above case.

Hereinafter, in the present disclosure, methods for mitigating interference as described above are proposed.

Embodiment 1

This embodiment relates to a method for newly defining the usage of SRS related to interference mitigation.

As shown in Table 8 above, in terms of the current standard, SRS usage is largely based on four purposes such as beam management, codebook, non-codebook, and antenna switching.

In this regard, a new SRS usage may be defined/added to configure/define to be used for the purpose of interference mitigation or for the sounding purpose for the CJT scheme.

In order to control interference in the CJT scheme, the aforementioned beamformed SRS transmission may be considered. When beamformed SRS is used, direction and/or power control for SRS transmission is possible. Accordingly, in SRS transmission, effective interference control may be possible through transmission suitably performed to a target cell or control of a direction that causes interference.

In this regard, the same/similar effect may occur through an SRS or the like configured for beam management, but this may be applied only to a serving cell (or serving TRP). Therefore, it may be effective to newly define/regulate the usage of SRS with a separate purpose for extending and applying to a cell (or related TRP) associated with the CJT scheme. For example, new usage for the SRS may be named interference management, interference mitigation, interference avoidance, and the like. Hereinafter, methods related to configuring a new usage for SRS transmission for that purpose will be described.

For example, the terminal that has configured/triggered the SRS configured for the new usage may interpret the CSI-RS configured in the (existing) associated CSI-RS information, differently from the existing, as meaning to transmit a beamformed/precoded SRS that minimizes interference in the corresponding CSI-RS direction. That is, when the terminal receives a configuration for an SRS resource set based on a CSI-RS resource (e.g., NZP CSI-RS resource ID), if the new usage is configured for the corresponding SRS resource set, the terminal may perform SRS transmission through a beam that minimizes interference with respect to the corresponding beam, rather than a beam (e.g., a spatial filter) corresponding to the CSI-RS resource.

For another example, when an SRS is configured for a new usage, RS information included in a plurality of (e.g., two) associated CSI-RS/spatial relation info/UL TCI state/joint TCI state may be included in SRS configuration. In this case, UL Tx beams corresponding to the plurality of associated CSI-RS/spatial relation info/UL TCI state/joint TCI state may be determined/used based on an indication according to pre-defined rule(s) and/or dynamic signaling (e.g., MAC-CE, DCI), etc.

As a specific example, in the case of the method based on the pre-defined rule, the SRS may be repeatedly transmitted sequentially according to a specific repetition order or according to a specific pattern. Alternatively, the UL Tx beams (transmission beam(s)) may be determined based on an identifier (ID) of a TRP/cell triggering corresponding SRS transmission. A plurality of UL Tx beams as described above may be used for the purpose of selecting a UL Tx beam optimized for a specific TRP/cell or reducing interference with respect to a specific TRP/cell.

For another example, it may be defined/promised in advance that specific information is mapped to a specific TRP/cell. As a specific example, spatial relation info and/or UL TCI state/joint TCI state included in SRS configuration may be interpreted as reference information for a desired TRP (i.e., TRP related to acquiring channel information). Alternatively, the associated CSI-RS included in the SRS configuration may be interpreted as reference information for a TRP causing interference. Based on this interpretation, a UL Tx beam may be configured/determined.

For another example, a new usage for SRS may be configured together with a previously configured usage (e.g., beam management, codebook, non-codebook, antenna switching). In this case, a signal for activating the new usage may be separately indicated, or a UL Tx beam indicated for the new usage based on a pre-defined rule may be used.

As a specific example, a case in which the new usage is configured together with an existing beam management or non-codebook usage may be considered. In this case, it is possible to configure/promise to unconditionally use a Tx beam that is configured/indicated/promised within a new usage, not to information of a Tx beam indicated by an associated CSI-RS or spatial relation info configured based on an existing usage. Alternatively, if there is a priority for the associated CSI-RS or spatial relation info, it is possible to configure/promise that the terminal uses a UL Tx beam for which the associated CSI-RS or spatial relation info with a high priority is configured.

Here, the UL Tx beam may include a beam for SRS/PUSCH/PUCCH/PRACH transmission. That is, UL transmission to which the above-described UL Tx beam is applied may include SRS/PUSCH/PUCCH/PRACH transmission.

In order to use/apply an SRS configured for a new usage to subsequent UL transmissions such as PUSCH/PUCCH/PRACH, a method of configuring/defining linkage between the corresponding SRS and PUSCH/PUCCH/PRACH may also be considered. That is, in the case of an SRS configured for a new usage, reference information and the like (e.g., associated CSI-RS or spatial relation info) configured/indicated in the corresponding usage may be configured as a spatial parameter (e.g., spatial relation info, UL TCI state, etc.) for transmission of another UL channel/RS (e.g., PUSCH, PUCCH, PRACH, etc.). In addition, in the case of an SRS configured for a new usage, reference information and the like (e.g., associated CSI-RS or spatial relation info) configured/indicated in the corresponding usage may be configured as QCL information for a TCI state of another DL channel/RS (e.g., PDSCH, PDCCH, SSB, CSI-RS, etc.).

In addition, in order to effectively support the new SRS usage described in this embodiment, explicit or implicit beam indication may be required.

Embodiment 2

This embodiment relates to a scheme for indicating a Tx beam of a terminal for interference mitigation in the above-described present disclosure.

In the case of the CJT scheme, a plurality of TRPs/cells may be united/associated to support a terminal. In this case, information on channels with each terminal may need to be acquired for each of a plurality of TRPs/cells, and information on channels of not only the serving cell/TRP but also neighboring TRPs/cells and/or associated TRPs/cells may also need to be acquired. Therefore, SRS transmission to an associated cell/TRP may be required, and here, SRS transmission may mean beamformed SRS transmission.

For example, a scheme of linking an associated CSI-RS corresponding to a neighboring/associated TRP/cell with an SRS may be considered. This scheme is an example of beamforming for a desired signal. In this case, the terminal may use the Rx spatial filter (i.e., reception beam) for receiving the associated CSI-RS as a Tx spatial filter (i.e., Tx beam) as it is or partially modified, and may use it as a Tx spatial filter (i.e., Tx beam). Through this, SRS transmission may be performed.

For another example, as shown in FIG. 17, SRS/PUSCH (beamforming) transmission transmitted by UE 2 to TRP 2 may be a desired signal from the side of UE 2, but may correspond to an interference signal on the side of TRP 2 receiving the SRS of UE 1. Therefore, in consideration of such an interference signal, a scheme of changing a Tx beam or restricting the use of a specific beam during UL transmission of the terminal may be considered. Here, UL transmission may include SR transmission, PUSCH transmission, PUCCH transmission, PRACH transmission, and the like.

In this regard, the base station may configure/indicate the terminal to restrict the specific beam. For example, for UL transmission, the base station may restrict the use of a specific Tx filter (i.e., Tx beam) through higher layer signaling.

As an example of the scheme for higher layer signaling, the use of a Tx beam corresponding to an identifier (ID) of SSB and/or CSI-RS may be restricted for UL transmission of the terminal. That is, the terminal may exclude the UL Tx spatial filter corresponding to the indicated SSB and/or CSI-RS identifier from UL transmission.

As a specific example of the above-described beam restriction indication, a transmitted precoding matrix indicator (TPMI) indication may be used or a restriction on a specific azimuth or specific coordinates may be indicated. Here, the specific azimuth or the specific coordinates may be according to the global cooperation-based transmission scheme, and the specific azimuth may correspond to horizontal and/or vertical angles, and the specific coordinates may correspond to (x, y, z) coordinates. That is, when the restricted azimuth is indicated as described above, the terminal may not use the UL Tx spatial filter corresponding to the angle.

As another example of the scheme for higher layer signaling, a specific flag (eg, 1-bit flag) or an indicator may be introduced to configure/define UL transmission using a specific default beam. That is, the terminal may not use the spatial Tx filter indicated through the associated CSI-RS or spatial relation information and the like which is applied to the existing SRS resource, and the terminal may perform UL transmission using a beam (i.e., spatial filter) indicated as a pre-promised or default beam. For example, the default beam may include a non-precoded beam.

In relation to the above-described embodiments of the present disclosure, a method for determining a UL Tx spatial filter (i.e., a UL Tx beam) may be described in two ways. That is, there are a method of performing UL transmission using a Tx beam optimally for a desired base station (e.g., TRP) by the terminal and a method of performing UL transmission using a Tx beam that reduces interference with respect to a base station (e.g., TRP) that causes interference by the terminal.

That is, as described above in an embodiment of the present disclosure (e.g., Embodiment 1), since reference resources according to the two purposes may be different, considering this point, a method of configuring a plurality of reference resources may be required. For example, information on a plurality of reference resources may include SSB and/or CSI-RS related information for a desired TRP/cell and SSB and/or CSI-RS related information for a TRP/cell causing interference.

In addition, as described above, not only a method of providing SSB and/or CSI-RS related information reducing interference to a base station causing interference, but also a method of providing/configuring a plurality of (e.g., N) SSBs and/or CSI-RSs related information may be considered. Alternatively, a method of providing/configuring the best SSB and/or CSI-RS related information and the worst SSB and/or CSI-RS related information may be considered.

In addition, for example, a method based on a minimum mean square error (MMSE) filter may be applied to determine the UL Tx beam of the terminal through the method described above in the present disclosure. That is, the terminal may configure a spatial filter to increase the power/quality of a signal for a desired base station and decrease the power/quality of a signal for a base station causing interference. The terminal may use the configured spatial filter as a spatial Tx filter for SRS transmission.

In addition, a procedure/configuration for reporting capability of a terminal related thereto may be introduced/considered.

Information on the TRP described in the present disclosure may be identified/distinguished by at least one of a TRP index, a cell identifier (cell ID), a CORESET pool index (CORESETPoolIndex), a beam index (based on SSB, etc.), or a TCI state index.

Methods proposed in the present disclosure may be configured in combination with each other. In addition, although the proposed methods have been described mainly in consideration of the transmission environment of the CJT scheme, the proposed methods may be applied/used as an extension to dynamic point selection (DPS)/non coherent-joint transmission (NC-JT).

The proposed methods in the present disclosure have been described based on transmission based on multiple TRPs, but may be extended and applied to a plurality of panels or a plurality of beams within a single base station.

In the case of signals transmitted from different base stations/TRPs/panels/beams, long-term fading such as path-loss, average delay, average Doppler shift, etc. from a terminal reception point of view (long-term fading) may be different. In addition, regarding signals transmitted from different base stations/TRPs/panels/beams, beams to be applied to reception by the terminal (e.g., QCL spatial reception parameter, refer QCL type D of 3GPP TS 38.214) may be different. In this respect, signals transmitted from different base stations/TRPs/panels/beams may be distinguished from signals transmitted from the same base station/TRP/panel/beam. That is, antenna ports transmitted and received in the same TRP may correspond to QCLed antenna ports (e.g., CSI-RS antenna ports within the same CSI-RS resource), and antenna ports transmitted and received in different TRPs may correspond to non-QCLed antenna ports (e.g., CSI-RS antenna ports in different CSI-RS resources).

Figure 18:
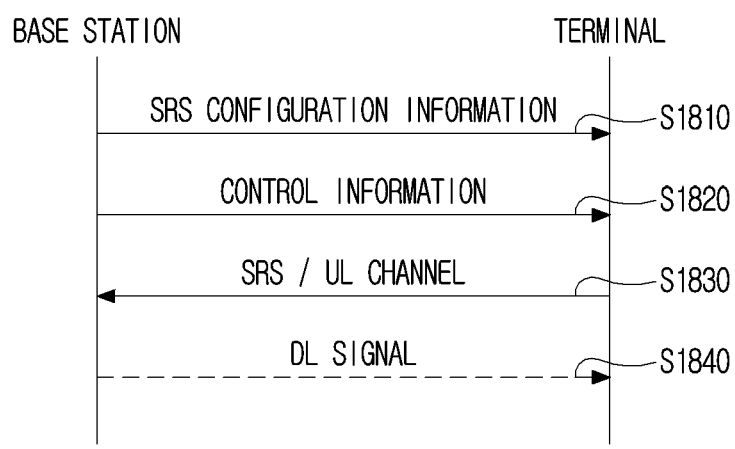
FIG. 18 illustrates signaling between a base station and a terminal for SRS transmission and reception in a wireless communication system to which the present disclosure can be applied.

FIG. 18 illustrates signaling between a base station and a terminal for SRS transmission and reception in a wireless communication system to which the present disclosure may be applied.

In FIG. 18, signaling between a base station and a terminal based on the above proposed methods (e.g., any one of Embodiment 1 and Embodiment 2 and detailed embodiments thereof, or a combination of one or more (detailed) embodiments) may be illustrated. The example of FIG. 18 is for convenience of description and does not limit the scope of the present disclosure. Some step(s) illustrated in FIG. 18 may be omitted depending on circumstances and/or settings. In addition, the base station and the terminal in FIG. 18 are only examples, and may be implemented as the device illustrated in FIG. 21 below. For example, the processor 102/202 of FIG. 21 may control transmission and reception of channels/signals/data/information using the transceiver 106/206, and may control to store channels/signals/data/information or the like to be transmitted or received in the memory 104/204.

Figure 21:
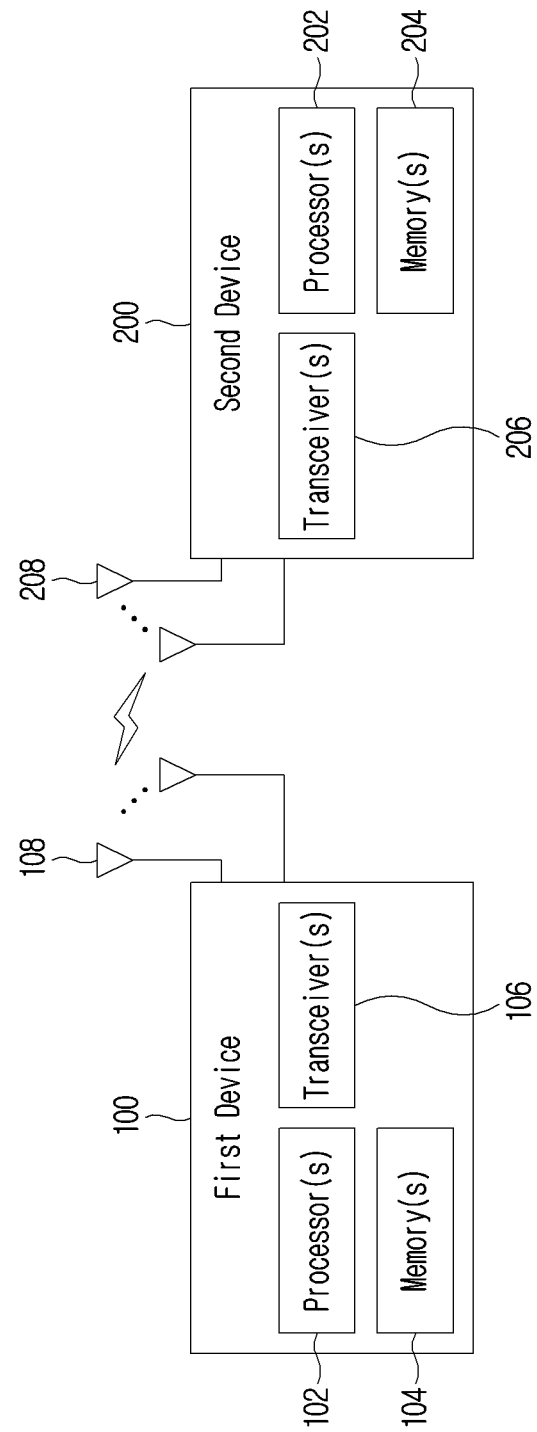
FIG. 21 is a diagram which illustrates a block diagram of a wireless communication device according to an embodiment of the present disclosure.

In addition, the operation of FIG. 18 may be processed by one or more processors 102 and 202 of FIG. 21, and the operation of FIG. 18 may be performed by at least one processor (eg, 102 and 202) of FIG. It may be stored in a memory (eg, one or more memories 104 and 204 of FIG. 21) in the form of a command/program (eg, instruction or executable code) for driving.

A base station may be a general term for an object that transmits and receives data with a terminal. For example, the base station may be a concept including one or more transmission points (TPs), one or more transmission and reception points (TRPs), and the like. Also, the TP and/or the TRP may include a panel, a transmission and reception unit, and the like of a base station. In addition, "TRP" is replaced with expressions such as panel, antenna array, cell (e.g., macro cell/small cell/pico cell, etc.), TP, base station (e.g., gNB, etc.) and can be applied. As described above, TRPs may be classified according to information (e.g., index, ID) on the CORESET group (or CORESET pool). For example, when one terminal is configured to transmit/receive with multiple TRPs (or cells), this may mean that multiple CORESET groups (or CORESET pools) are configured for one terminal. Configuration of such a CORESET group (or CORESET pool) may be performed through higher layer signaling (e.g., RRC signaling, etc.).

In step S1810, the base station may transmit SRS configuration information to the terminal. That is, the terminal may receive SRS configuration information from the base station.

For example, the SRS configuration information may include configuration information for transmitting and receiving the SRS based on the above-described proposed method (e.g., any one of Embodiment 1 and Embodiment 2 and detailed embodiments thereof, or a combination of one or more (detailed) embodiments).

For example, the SRS configuration information may include SRS resource configuration (e.g., SRS-ResourceSet/SRS-Resource)/SRS resource type (e.g., aperiodic/semi-persistent/periodic)/Usage (e.g., usage for antennaswitching/codebook/noncodebook/beammanagement/reciprocity measurement/interference control, etc.), the number of SRS ports, etc. For example, the SRS configuration information may be transmitted through higher layer signaling (e.g., RRC signaling, MAC CE, etc.).

For example, a plurality of SRS resources may be configured/indicated based on the SRS configuration information, in the above-described proposed method (e.g., any one of Embodiment 1 and Embodiment 2 and detailed embodiments thereof, or a combination of one or more (detailed) embodiments), and each SRS resource of the plurality of SRS resources may correspond to/associate with a different CC (/BWP). For example, mapping between SRS resources and ports may be configured based on the SRS configuration information. For example, based on the SRS configuration information, SRS port(s) included in each SRS resource may be configured to correspond to different TX chains (/ports)

of the terminal. For example, based on the SRS configuration information, a UL band/BWP close to the DL (active) band/BWP configured for the terminal may be configured for channel acquisition using the corresponding SRS. For example, a timing gap considering CC/BWP switching may be configured based on the SRS configuration information.

In step S1820, the base station may transmit control information to the terminal. That is, the terminal may receive control information from the base station.

For example, the control information may be transmitted/received through DCI. For example, the control information may include information related to transmission of SRS and/or UL channels. For example, the control information may include information triggering SRS transmission. For example, one or more SRS resource sets may be triggered based on the control information. For example, SRS related information may be configured based on the control information.

In step S1830, the base station may receive the SRS/UL channel from the terminal. That is, the terminal may transmit the SRS/UL channel to the base station.

For example, the SRS/UL channel may be received/transmitted based on the aforementioned SRS configuration information and/or control information. For example, the SRS/UL channel may be transmitted and received based on the above-described proposed method (e.g., any one of Embodiment 1 and Embodiment 2 and detailed embodiments thereof, or a combination of one or more (detailed) embodiments). For example, the SRS may be transmitted and received based on port-wise frequency hopping (eg, frequency hopping per carrier/BWP). For example, the mapping/transmission order/location between an SRS port and CC/BWP based on frequency hopping may be configured based on the above-described proposed method (e.g., any one of Embodiments 1 and 2 and detailed embodiments thereof, or combination of one or more (detailed) embodiments).

For example, when an SRS and a channel (e.g., PUCCH/PUSCH) on which HARQ-ACK information (e.g., ACK/NACK information) is transmitted collide, the terminal may drop the SRS, or may delay the collided SRS and transmit at the subsequent valid transmission occasion.

In step S1840, the base station may transmit a DL reference signal (e.g., CSI-RS, etc.) to the terminal. That is, the terminal may receive a DL reference signal from the base station.

For example, the base station may obtain characteristic information (e.g., basis vector/delay characteristics for the UL channel) of the UL channel based on the SRS received in step S1830, and the DL reference signal may be transmitted based on the obtained information. For example, the DL reference signal may be used for CSI measurement of a DL channel of a terminal.

Figure 19:
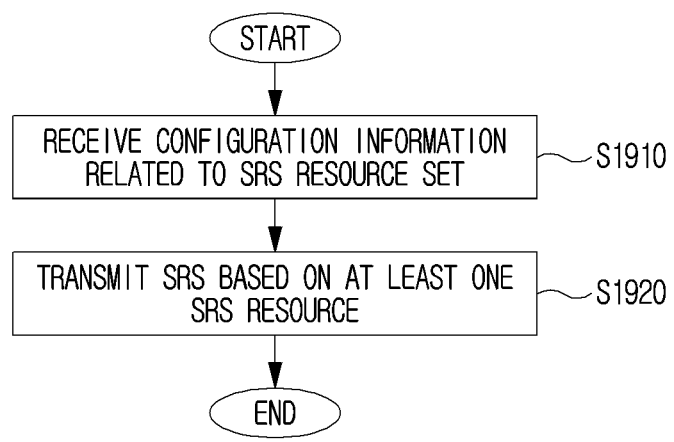
FIG. 19 is a diagram illustrating an operation of a terminal in a method for transmitting and receiving a sounding reference signal according to an embodiment of the present disclosure.

FIG. 19 is a diagram illustrating an operation of a terminal for a method for transmitting and receiving a sounding reference signal (SRS) according to an embodiment of the present disclosure.

FIG. 19 illustrates an operation of a terminal based on the previously proposed method (e.g., any one or a combination of Embodiments 1 to 2 and detailed embodiments thereof). The example of FIG. 19 is for convenience of description, and does not limit the scope of the present disclosure. Some step(s) illustrated in FIG. 19 may be omitted depending on circumstances and/or configuration. In addition, the terminal in FIG. 19 is only one example, and may be implemented as the apparatus illustrated in FIG. 21 below. For example, the processor 102/202 of FIG. 21 may control to transmit and receive channel/signal/data/information (e.g., RRC signaling, MAC CE, DCI for UL/DL scheduling, SRS, PDCCH, PDSCH, PUSCH, PUCCH, etc.) using the transceiver 106/206, and may control to store channel/signal/data/information to be transmitted or received in the memory 104/204.

Also, the operation of FIG. 19 may be processed by one or more processors (102, 202) in FIG. 21, and the operation of FIG. 19 may be stored in a memory (e.g., one or more memories (104, 204) in FIG. 21, in the form of instructions/programs (e.g., instructions, executable code) for driving at least one processor (102, 202) in FIG. 21.

Referring to FIG. 19, in step S1910, the terminal may receive configuration information related to an SRS resource set for the SRS.

Here, the SRS resource set includes configuration for at least one SRS resource, configuration for a usage related to the SRS, and at least one reference resource related to the SRS (e.g., associated CSI-RS, space relation info, reference resources related to UL/joint TCI state, etc.).

For example, the corresponding configuration information may be information for configuring the SRS in the above-described proposed methods (e.g., any one of Embodiment 1 and Embodiment 2 and detailed embodiments thereof, or a combination of one or more (detailed) embodiments), and may be SRS configuration information in step S1810 of FIG. 18.

In step S1920, the terminal may transmit an SRS based on at least one SRS resource according to the SRS resource set.

At this time, when the SRS resource set is configured for a specific usage and one reference resource is configured by the configuration information, the SRS may be transmitted based on a first spatial parameter different from the second spatial parameter corresponding to the one reference resource. In addition, the corresponding method may be extended and applied even when one or more reference resources are configured.

For example, the one reference resource may correspond to a CSI-RS resource associated with the SRS resource set. In addition, the first spatial parameter may be related to a first UL Tx spatial filter, and the second spatial parameter may be related to a second UL Tx spatial filter.

In addition, such as the above-described proposed methods (e.g., any one of the first embodiment and the second embodiment and the detailed embodiments thereof, or a combination of one or more (specific) embodiments), the specific usage may correspond to a usage for controlling interference related to channel measurement. For example, the channel measurement may be related to acquisition of DL channel information in a coherent joint transmission-based scheme (e.g., the CJT scheme described above).

In addition, for another example, when the SRS resource set is configured for the specific usage and a plurality of reference resources are configured by the configuration information, the SRS may be transmitted based on a plurality of spatial parameters corresponding to the plurality of reference resources. In this case, a spatial parameter applied to transmission of the SRS may be determined by a pre-configured rule among the plurality of spatial parameters. A pre-configured rule may be defined based on at least one of a repetition transmission order or a transmission pattern of the SRS.

In addition, as in the above-described proposed methods (e.g., any one of Embodiment 1 and Embodiment 2 and detailed embodiments thereof, or a combination of one or more (detailed) embodiments), the specific usage may be configured together with other usage (e.g., beam management, codebook, non-codebook, antenna switching, etc.) for the SRS resource set.

In addition, as in the above-described proposed methods (e.g., any one of Embodiment 1 and Embodiment 2 and detailed embodiments thereof, or a combination of one or more (specific) embodiments), the terminal may receive, from a base station, information restricting application of the Tx spatial filter corresponding to the second spatial parameter to transmission of the SRS. In this regard, the first spatial parameter may correspond to a pre-configured spatial parameter or default spatial parameter for transmission of the SRS.

Figure 20:
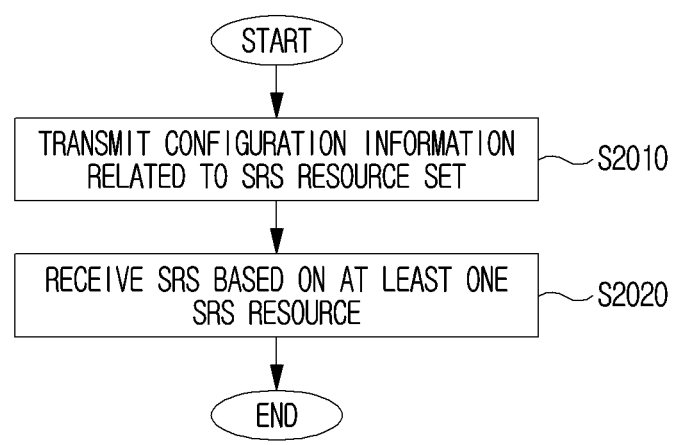
FIG. 20 is a diagram illustrating an operation of a base station for a method for transmitting and receiving a sounding reference signal according to an embodiment of the present disclosure.

FIG. 20 is a diagram illustrating an operation of a base station for a method for transmitting and receiving a sounding reference signal (SRS) according to an embodiment of the present disclosure.

FIG. 20 illustrates an operation of a base station based on the previously proposed method (e.g., any one or a combination of Embodiments 1 to 2 and detailed embodiments thereof). The example of FIG. 20 is for convenience of description, and does not limit the scope of the present disclosure. Some step(s) illustrated in FIG. 20 may be omitted depending on circumstances and/or configuration. In addition, the base station in FIG. 20 is only one example, and may be implemented as the apparatus illustrated in FIG. 21 below. For example, the processor 102/202 of FIG. 21 may control to transmit and receive channel/signal/data/information (e.g., RRC signaling, MAC CE, DCI for UL/DL scheduling, SRS, PDCCH, PDSCH, PUSCH, PUCCH, etc.) using the transceiver 106/206, and may control to store channel/signal/data/information to be transmitted or received in the memory 104/204.

Also, the operation of FIG. 20 may be processed by one or more processors (102, 202) in FIG. 21, and the operation of FIG. 20 may be stored in a memory (e.g., one or more memories (104, 204) in FIG. 21, in the form of instructions/programs (e.g., instructions, executable code) for driving at least one processor (102, 202) in FIG. 21.

Referring to FIG. 20, in step S1910, the base station may transmit configuration information related to an SRS resource set for the SRS.

Here, the SRS resource set includes configuration for at least one SRS resource, configuration for a usage related to the SRS, and at least one reference resource related to the SRS (e.g., associated CSI-RS, space relation info, reference resources related to UL/joint TCI state, etc.).

For example, the corresponding configuration information may be information for configuring the SRS in the above-described proposed methods (e.g., any one of Embodiment 1 and Embodiment 2 and detailed embodiments thereof, or a combination of one or more (detailed) embodiments), and may be SRS configuration information in step S1810 of FIG. 18.

In step S2020, the base station may receive an SRS based on at least one SRS resource according to the SRS resource set.

At this time, when the SRS resource set is configured for a specific usage and one reference resource is configured by the configuration information, the SRS may be transmitted based on a first spatial parameter different from the second spatial parameter corresponding to the one reference resource. In addition, the corresponding method may be extended and applied even when one or more reference resources are configured.

For example, the one reference resource may correspond to a CSI-RS resource associated with the SRS resource set.

In addition, the first spatial parameter may be related to a first UL Tx spatial filter, and the second spatial parameter may be related to a second UL Tx spatial filter.

In addition, such as the above-described proposed methods (e.g., any one of the first embodiment and the second embodiment and the detailed embodiments thereof, or a combination of one or more (specific) embodiments), the specific usage may correspond to a usage for controlling interference related to channel measurement. For example, the channel measurement may be related to acquisition of DL channel information in a coherent joint transmission-based scheme (e.g., the CJT scheme described above).

In addition, for another example, when the SRS resource set is configured for the specific usage and a plurality of reference resources are configured by the configuration information, the SRS may be transmitted based on a plurality of spatial parameters corresponding to the plurality of reference resources. In this case, a spatial parameter applied to transmission of the SRS may be determined by a pre-configured rule among the plurality of spatial parameters. A pre-configured rule may be defined based on at least one of a repetition transmission order or a transmission pattern of the SRS.

In addition, as in the above-described proposed methods (e.g., any one of Embodiment 1 and Embodiment 2 and detailed embodiments thereof, or a combination of one or more (detailed) embodiments), the specific usage may be configured together with other usage (e.g., beam management, codebook, non-codebook, antenna switching, etc.) for the SRS resource set.

In addition, as in the above-described proposed methods (e.g., any one of Embodiment 1 and Embodiment 2 and detailed embodiments thereof, or a combination of one or more (specific) embodiments), the terminal may receive, from a base station, information restricting application of the Tx spatial filter corresponding to the second spatial parameter to transmission of the SRS. In this regard, the first spatial parameter may correspond to a pre-configured spatial parameter or default spatial parameter for transmission of the SRS.

General Device to which the Present Disclosure May be Applied

FIG. 21 illustrates a block diagram of a wireless communication device according to an embodiment of the present disclosure.

In reference to FIG. 21, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

What is claimed is:
1. A method comprising:
 receiving configuration information related to a sounding reference signal (SRS) resource set; and
 transmitting an SRS based on the SRS resource set,
 wherein the configuration information includes information for an associated reference resource for the SRS resource set, and
 wherein, based on the SRS resource set being configured with a specific usage for interference management by the configuration information, the SRS is transmitted based on a first spatial parameter, which is different from a second spatial parameter for the associated reference resource.
2. The method of claim 1,
 wherein the associated reference resource corresponds to a resource of a channel state information-reference signal (CSI-RS) associated with the SRS resource set.
3. The method of claim 1,
 wherein the interference management relates to controlling interference for a coherent joint transmission.
4. The method of claim 1,
 wherein the first spatial parameter is related to a first uplink transmission spatial filter, and
 wherein the second spatial parameter is related to a second uplink transmission spatial filter.

5. The method of claim 1,
wherein, based on the SRS resource set being configured with the specific usage and a plurality of associated reference resources being configured by the configuration information, the SRS is transmitted based on a plurality of spatial parameters for the plurality of associated reference resources.

6. The method of claim 5,
wherein a spatial parameter applied to transmission of the SRS is determined by a pre-configured rule among the plurality of spatial parameters, and
wherein the pre-configured rule is defined based on at least one of a repetition transmission order for the SRS or a transmission pattern for the SRS.

7. The method of claim 1,
wherein the specific usage is configured along with at least one of a beam management usage, a codebook usage, a non-codebook usage, or an antenna switching usage for the SRS resource set.

8. The method of claim 1, further comprising:
receiving information for restricting application of the second spatial parameter to transmission of the SRS.

9. The method of claim 1,
wherein the first spatial parameter corresponds to a default spatial parameter which is pre-configured for transmission of the SRS.

10. An apparatus comprising:
at least one transceiver; and
at least one processor coupled with the at least one transceiver,
wherein the at least one processor is configured to:
receive configuration information related to a sounding reference signal (SRS) resource set; and
transmit an SRS based on the SRS resource set,
wherein the configuration information includes information for an associated reference resource for the SRS resource set, and
wherein, based on the SRS resource set being configured with a specific usage for interference management by the configuration information, the SRS is transmitted based on a first spatial parameter, which is different from a second spatial parameter for the associated reference resource.

11. An apparatus comprising:
at least one transceiver; and
at least one processor coupled with the at least one transceiver,
wherein the at least one processor is configured to:
transmit configuration information related to a sounding reference signal (SRS) resource set; and
receive an SRS based on the SRS resource set,
wherein the configuration information includes information for an associated reference resource for the SRS resource set, and
wherein, based on the SRS resource set being configured with a specific usage for interference management by the configuration information, the SRS is transmitted based on a first spatial parameter, which is different from a second spatial parameter for the associated reference resource.

12. The method of claim 1,
wherein the first spatial parameter corresponds to a spatial parameter which is intended to reduce interference with transmission and reception based on the second spatial parameter.

* * * * *